United States Patent
Teo et al.

(10) Patent No.: US 11,771,259 B2
(45) Date of Patent: Oct. 3, 2023

(54) VENTING ARRANGEMENT FOR BEVERAGE FORMING APPARATUS

(71) Applicant: Keurig Green Mountain, Inc., Burlington, MA (US)

(72) Inventors: Choon Meng Teo, Johor (MY); Yee Leong Pang, Johor (MY); Kim Lai Wong, Johor (MY); John Couture, Burlington, MA (US); Richard Pasquini, Alfred, ME (US)

(73) Assignee: Keurig Green Mountain, Inc., Burlington, MA (US)

( * ) Notice: Subject to any disclaimer, the term of this patent is extended or adjusted under 35 U.S.C. 154(b) by 711 days.

(21) Appl. No.: 16/619,613

(22) PCT Filed: Jun. 5, 2018

(86) PCT No.: PCT/US2018/035972
§ 371 (c)(1),
(2) Date: Dec. 5, 2019

(87) PCT Pub. No.: WO2018/226634
PCT Pub. Date: Dec. 13, 2018

(65) Prior Publication Data
US 2020/0154938 A1    May 21, 2020

Related U.S. Application Data

(60) Provisional application No. 62/515,414, filed on Jun. 5, 2017.

(51) Int. Cl.
*A47J 31/32* (2006.01)
*A47J 31/46* (2006.01)
(Continued)

(52) U.S. Cl.
CPC ............ *A47J 31/461* (2018.08); *A47J 31/32* (2013.01); *A47J 31/4407* (2013.01); *A47J 31/465* (2013.01); *A47J 31/34* (2013.01)

(58) Field of Classification Search
CPC ............ A47J 31/24; A47J 31/32; A47J 31/34
(Continued)

(56) References Cited

U.S. PATENT DOCUMENTS 8,387,516 B1    3/2013   Reynolds
9,888,807 B2 *   2/2018   Starr .................... A47J 31/0576
(Continued)

OTHER PUBLICATIONS

International Search Report and Written Opinion dated Sep. 27, 2018 in connection with International Application No. PCT/US2018/035972.
(Continued)

*Primary Examiner* — Reginald Alexander
(74) *Attorney, Agent, or Firm* — Wolf, Greenfield & Sacks, P.C.

(57) ABSTRACT

Aspects relating to a method and apparatus for venting a heater tank of a beverage forming apparatus using a vent valve that is opened and closed based on an operation to move a brew chamber lid between an open lid position and a closed lid position are provided. In one aspect, the vent valve may be positioned on a vent line distinct from a delivery line that delivers heated liquid from the heater tank to the brew chamber. In another aspect, at least a portion of the delivery line may extend downwardly from the top of the heater tank to a location between the top and the bottom of the heater tank. In another aspect, the at least a portion of the vent valve may be attached to the handle for movement with the handle.

27 Claims, 19 Drawing Sheets

(51) Int. Cl.
*A47J 31/44* (2006.01)
*A47J 31/34* (2006.01)

(58) Field of Classification Search
USPC .......................................... 99/302 R
See application file for complete search history.

(56) References Cited

U.S. PATENT DOCUMENTS

| 9,980,602 | B2* | 5/2018 | Hanes | A47J 31/465 |
| 2008/0115674 | A1* | 5/2008 | Huang | A47J 31/4407 |
| | | | | 99/279 |
| 2009/0007792 | A1* | 1/2009 | Glucksman | A47J 31/4407 |
| | | | | 99/287 |
| 2012/0199009 | A1* | 8/2012 | Zogg | A47J 31/4496 |
| | | | | 99/283 |
| 2016/0220062 | A1 | 8/2016 | Hanes et al. | |

OTHER PUBLICATIONS

International Preliminary Report on Patentability dated Dec. 19, 2019 in connection with International Application No. PCT/US2018/035972.
PCT/US2018/035972, Sep. 27, 2018, International Search Report and Written Opinion.
PCT/US2018/035972, Dec. 19, 2019, International Preliminary Report on Patentability.

* cited by examiner

VENTING ARRANGEMENT FOR BEVERAGE FORMING APPARATUS

CROSS-REFERENCE TO RELATED APPLICATIONS

This Application is a national stage filing under 35 U.S.C. § 371 of International Patent Application Serial No. PCT/US2018/035972, filed Jun. 5, 2018, which claims the benefit of U.S. Provisional Application Ser. No. 62/515,414, filed Jun. 5, 2017.

BACKGROUND

1. Field

Systems and methods related to beverage forming systems, such as coffee brewers that use a liquid to form a coffee beverage, are generally described.

2. Related Art

Beverage forming systems that use a liquid, such as water, to form a beverage are well known. For example, U.S. Pat. No. 8,361,527 discloses a beverage forming system that uses a beverage cartridge containing a beverage material to make a beverage by introducing liquid into the cartridge. Liquid provided to the cartridge may be heated in a tank prior to delivery to the cartridge.

SUMMARY

According to one aspect, a beverage forming apparatus is provided. The beverage forming apparatus may include, in some embodiments, a brew chamber arranged to hold a beverage ingredient. The brew chamber may include a liquid inlet to provide liquid for combining with the beverage ingredient to form a beverage and a beverage outlet to allow beverage to exit the brew chamber. The brew chamber may include a lid movable between an open lid position and a closed lid position. The beverage forming apparatus may include a heater tank having an inlet to receive liquid, a first outlet fluidly coupled to the liquid inlet of the brew chamber via a delivery line to deliver heated liquid from the heater tank to the brew chamber, and a second outlet fluidly coupled to a vent line. The first outlet may be distinct from the second outlet and the vent line may be distinct from the delivery line. The beverage forming apparatus may include a vent valve arranged to control passage of fluid out of the vent line. Opening and closing of the vent valve may be based on an operation to move the lid between the open and closed lid positions.

According to another aspect, a beverage forming apparatus is provided. The beverage forming apparatus may include a brew chamber arranged to hold a beverage ingredient. The brew chamber may include a liquid inlet to provide liquid for combining with the beverage ingredient to form a beverage and a beverage outlet to allow beverage to exit the brew chamber. The brew chamber may include a lid. The beverage forming apparatus may include a handle that is movable between an open handle position and a closed handle position to open and close the lid of the brew chamber. The beverage forming apparatus may include a heater tank having a top, a bottom, an inlet to receive liquid, and an outlet fluidly coupled to the liquid inlet of the brew chamber via a delivery line to deliver heated liquid from the heater tank to the brew chamber. At least a portion of the delivery line may extend downwardly from the top of the heater tank to a location between the top and the bottom of the heater tank. The beverage forming apparatus may include a vent line fluidly coupled to the heater tank. The beverage forming apparatus may include a vent valve arranged to control passage of fluid out of the vent line. Opening and closing of the vent valve may be based on an operation to move the lid between the open and closed lid positions.

According to yet another aspect, a beverage forming apparatus is provided. The beverage forming apparatus may include a brew chamber arranged to hold a beverage ingredient. The brew chamber may include a liquid inlet to provide liquid for combining with the beverage ingredient to form a beverage and a beverage outlet to allow beverage to exit the brew chamber. The brew chamber may include a lid. The beverage forming apparatus may include a handle that is movable between an open handle position and a closed handle position to open and close the lid of the brew chamber. The beverage forming apparatus may include a heater tank having an inlet to receive liquid and an outlet fluidly coupled to the liquid inlet via a delivery line to deliver heated liquid from the heater tank to the brew chamber. The beverage forming apparatus may include a vent line fluidly coupled to the heater tank. The beverage forming apparatus may include a vent valve arranged to control passage of fluid out of the vent line. At least a portion of the vent valve may be attached to the handle for movement with the handle such that movement of the handle from the closed handle position toward the open handle position opens the vent valve, and movement of the handle from the open handle position toward the closed handle position closes the vent valve.

These and other aspects of the invention will be apparent from the following description and claims.

BRIEF DESCRIPTION OF DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

It should be understood that aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
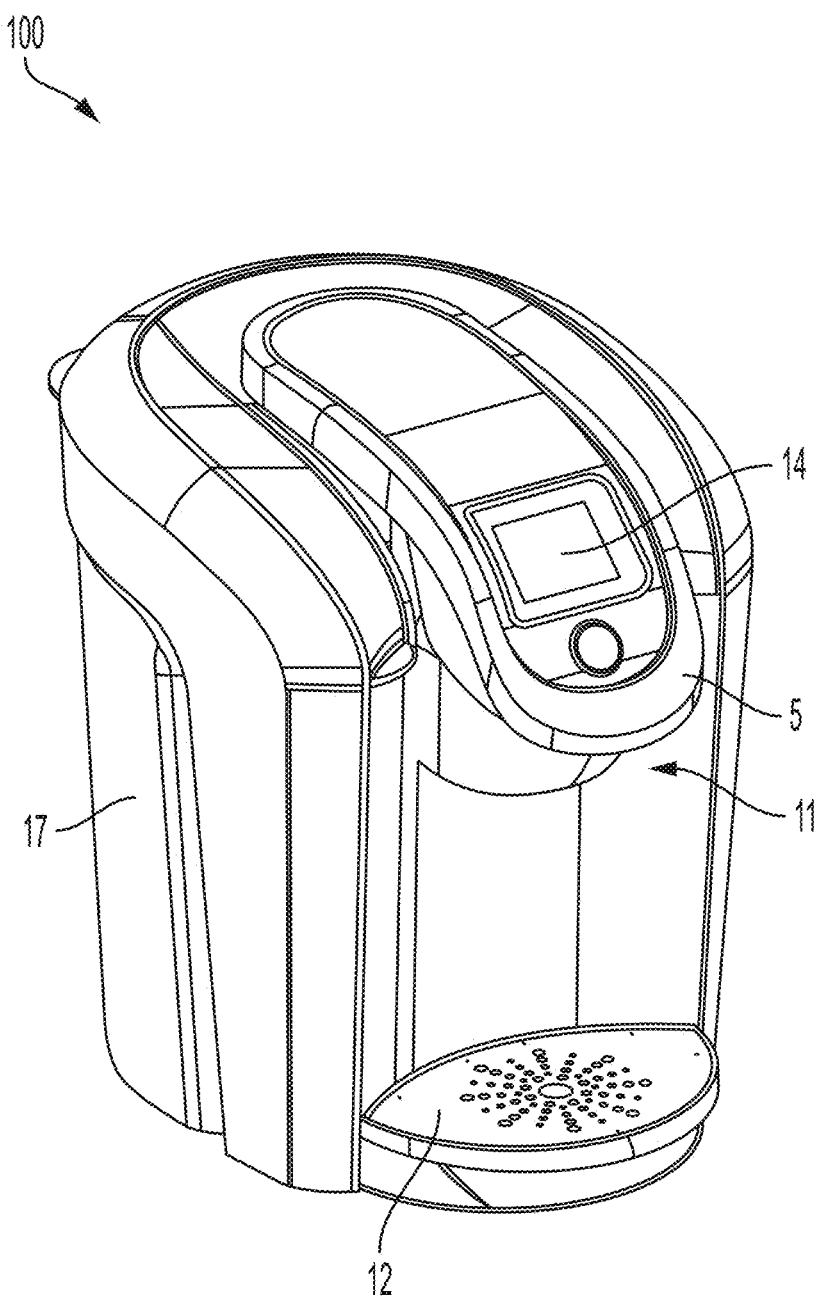
FIG. 1 is a front perspective view of a beverage forming apparatus in an illustrative embodiment.
Figure 2:
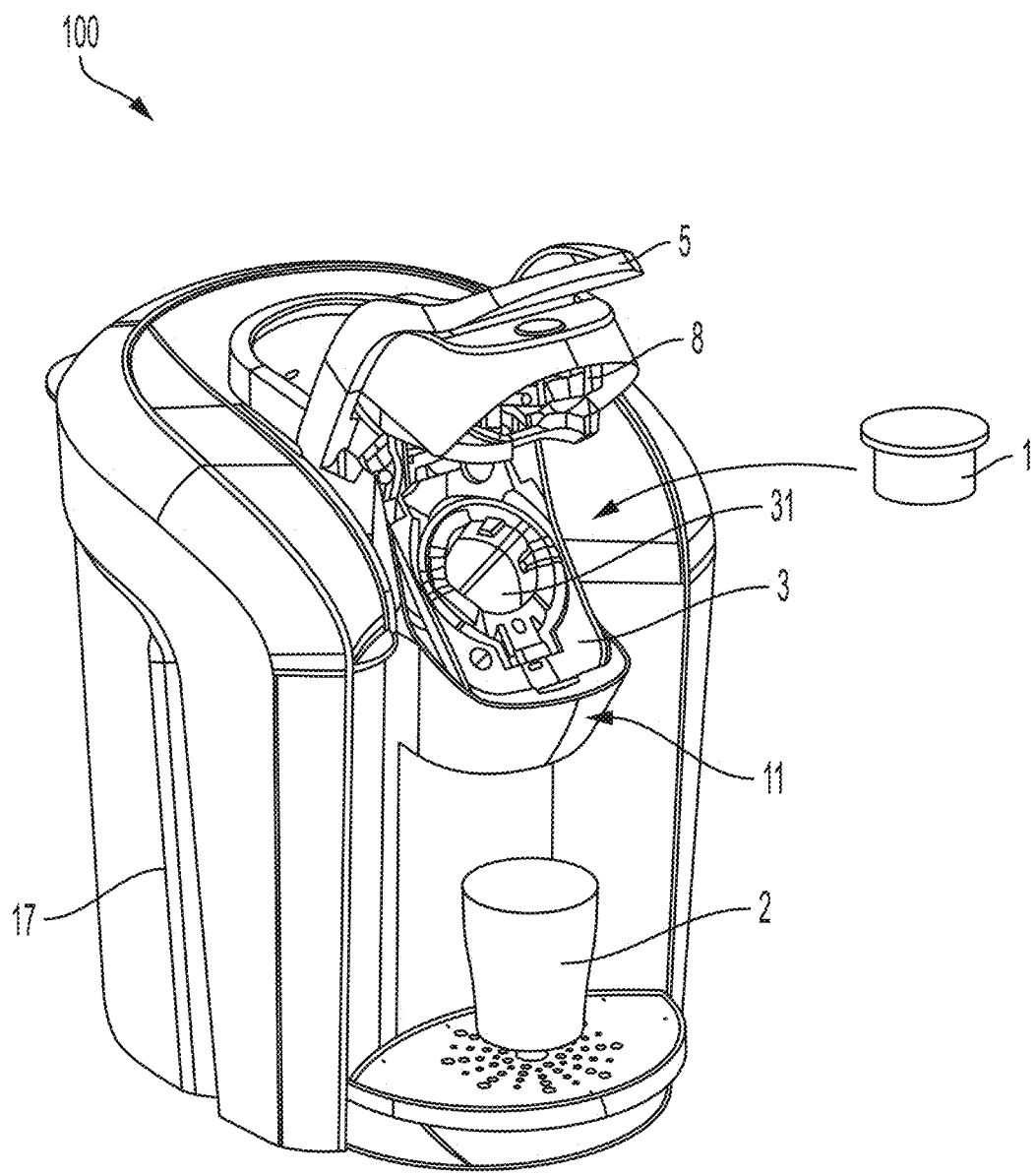
FIG. 2 is a front perspective view of the FIG. 1 embodiment with the cartridge holder exposed to receive a cartridge.

FIGS. 1 and 2 show a perspective view of a beverage forming apparatus 100 in an illustrative embodiment that incorporates aspects of the invention. Although the beverage forming apparatus 100 may be used to form any suitable beverage, such as tea, coffee, other infusion-type beverages, beverages formed from a liquid or powdered concentrate, soups, juices or other beverages made from dried materials, in this illustrative embodiment the apparatus 100 is arranged to form coffee or tea beverages. As is known in the art, a beverage cartridge 1 may be provided to the apparatus 100 and used to form a beverage that is deposited into a container 2, such as a user's cup. The cartridge 1 may be manually or automatically placed in a cartridge holder 3 of a brew chamber 11 of the beverage forming apparatus 100. For example, the cartridge holder 3 may be exposed to receive the cartridge 1 at an opening 31 of the holder 3 when the user operates a handle 5 or other actuator to open the brew chamber 11. In some embodiments, the apparatus 100 may include a brew chamber lid 8 that at least partially encloses an area with beverage ingredient (such as a beverage cartridge 1) when in the closed position, and permits access to the area when in the open position. In this embodiment, movement of the handle 5 or other actuator may cause the brew chamber lid 8 to move relative to the cartridge holder 3 (or the brew chamber lid 8 and holder 3 to otherwise move relative to each other, e.g., by having the holder 3 move) to expose the holder 3 for reception of a cartridge 1. With the cartridge 1 placed in the cartridge holder 3, the handle 5 may be operated to close the brew chamber 11, e.g., so that the brew chamber lid 8 moves to cooperate with the holder 3 to at least partially enclose the cartridge 1 so water or other precursor liquid can be introduced into the cartridge 1 to form a beverage. For example, with the cartridge 1 held in the brew chamber 11 by the cartridge holder 3, the cartridge 1 may be pierced to form inlet and outlet openings through which water or other precursor liquid enters the cartridge 1 and beverage that exits the cartridge 1, respectively. U.S. Pat. No. 8,361,527 describes a cartridge and a system for introducing liquid into the cartridge that may be used in embodiments of this invention, and is hereby incorporated by reference in its entirety. Of course, aspects of the invention may be employed with any suitably arranged apparatus 100, including drip-type coffee brewers, carbonated beverage machines, and others arranged to form a beverage regardless of how the beverage is formed. For example, a cartridge 1 may include any suitable materials to form a beverage, such as a carbon dioxide source used to carbonate water, a beverage mix, etc. Alternately, beverage ingredients need not be contained in a cartridge 1, but rather may be provided to the brew chamber 11 in a loose or uncontained form. In such embodiments, the brew chamber 11 may include a disposable or reusable filter to hold the beverage ingredient so that water or other liquid can be introduced to the brew chamber via an inlet and combined with the beverage ingredient to form a beverage that flows through the filter to an outlet of the brew chamber 11.

If used with the apparatus 100, cartridges may be arranged in different ways, and their configuration may depend at least in part on the nature of how a beverage ingredient in the cartridge is used to form a beverage. As will be understood, the cartridge 1 may contain any suitable beverage medium or ingredient, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriceuticals, etc.), and/or other beverage-making material (such as powdered milk or other creamers, sweeteners, thickeners, flavorings, and so on). In some embodiments, a cartridge 1 may include a container that includes an interior space having a first chamber and a second chamber that are separated by a filter. The container may have a frustoconical cup shape with a sidewall and a top opening covered by a lid, although other arrangements are possible. Also, the container need not necessarily have a defined shape, as is the case with some beverage sachets and pods.

When using a cartridge 1 to form a beverage, the lid and/or the container may be pierced to introduce liquid into the cartridge and receive beverage from the cartridge. (As used herein, "beverage" refers to a liquid substance intended for drinking that is formed when a liquid interacts with a beverage medium or ingredient. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.) The cartridge may be pierced in the brew chamber 11 by an inlet piercing element (e.g., a needle, multiple needles, a shower head, a solid or non-hollow needle, a cone, a pyramid, a knife, a blade, etc.) so that water or other liquid may be injected into the cartridge 1. Similarly, the cartridge may be pierced by an outlet piercing element (e.g., including any one of the elements mentioned above regarding the inlet piercing element) to form one or more outlet openings to allow beverage to exit the cartridge.

In this embodiment, the beverage forming apparatus 100 includes a housing 17 that houses and/or supports components of the beverage forming apparatus 100, such as a user interface 14 used to receive information from and provide information to a control system, and defines a container receiving area 12 at which the container 2 is positionable to receive beverage dispensed by the beverage forming apparatus 100 via a beverage outlet. Thus, at the container receiving area 12, the container 2 is associated with the beverage forming apparatus 100 to receive a dispensed beverage and may be supported by the housing 17. The container 2 may be received at the container receiving area 12 so that the container 2 is at least partially surrounded by the housing 17, or the container 2 may be more exposed when at the container receiving area 12, as shown in FIG. 2. In some embodiments, the container receiving area 12 may include a drip tray arranged to receive and hold liquid that spills from the container 2 or is discharged from the beverage outlet of the brew chamber 11.

Figure 3:
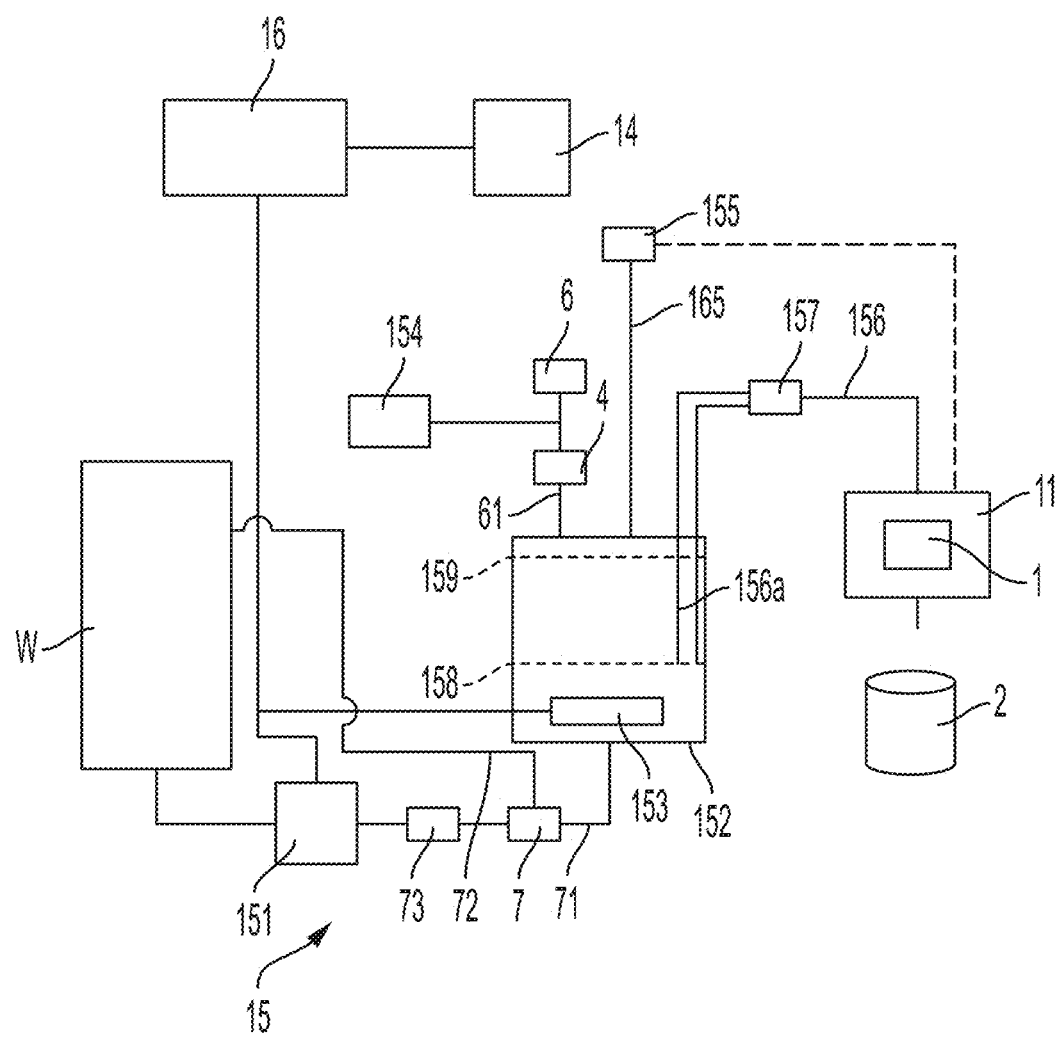
FIG. 3 is a schematic diagram of components of a beverage forming apparatus in an illustrative embodiment.

FIG. 3 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. In this embodiment, water or other precursor liquid may be provided by a liquid supply 15 to mix with a beverage ingredient at the brew chamber 11. The liquid supply 15 in this embodiment controls the volume of liquid provided to the brew chamber 11 by filling a heater tank 152 to a liquid dispense level 159 and then pressurizing the tank 152 by way of an air pump 154 so that liquid in the heater tank 152 is forced out of the delivery line 156 to a liquid inlet of the brew chamber 11. A check valve 157 may be provided in the delivery line 156 to allow flow from the heater tank 152 to the brew chamber 11, but resist flow from the brew chamber 11 to the heater tank 152.

In accordance with some aspects of the invention, the beverage forming apparatus may include a venting arrangement for venting a heater tank of the beverage forming apparatus. The venting arrangement may include a vent valve that is opened and closed based on an operation to move a handle and/or a brew chamber lid between an open lid position and a closed lid position. In some embodiments, the beverage forming apparatus includes a handle that is moveable between an open handle position and a closed handle position to open and close the lid of the brew chamber. In some embodiments, the vent valve is coupled to the handle such that movement of the handle from the closed handle position toward the open handle position opens the vent valve, and movement of the handle from the open handle position toward the closed handle position closes the vent valve. In some embodiments, opening and closing of the vent valve may be independent of movement of the lid of the brew chamber.

In the illustrative embodiment of FIG. 3, the beverage forming apparatus 100 includes a vent valve 155, which can be opened or closed to vent the heater tank 152. In some embodiments, the vent valve 155 may be based on an operation to move a handle and/or a brew chamber lid between an open position and a closed position. In some embodiments, the operation to move the brew chamber lid between an open and closed position comprises moving a handle between open and closed positions. Thus, the vent valve 155 may be linked to the handle 5 and/or brew chamber lid 8 such that when the handle 5 and/or brew chamber lid 8 are in the closed position (in which the brew chamber 11 is closed), and/or the brew chamber lid 8 is operated to close, the vent valve 155 is closed. However, if the handle 5 and/or the brew chamber lid 8 are moved from the closed position toward an open position, and/or the brew chamber lid 8 is operated to open, the vent valve 155 is opened to vent the heater tank 152. Unlike the orifice 6, which is a permanently open opening that will be described in a later section, the vent valve 155 may provide a relatively large cross-sectional area for flow or otherwise allow a relatively large volume of fluid at a relatively large flow rate to pass through the vent valve 155 when open. This may help reduce pressure in heater tank 152 to ambient pressure and/or to a pressure at which liquid is not caused to flow from the heater tank 152 to the brew chamber 11. Thus, opening the vent valve 155 may help prevent flow to the brew chamber 11, even if the air pump 154 continues to run.

According to one aspect, the vent valve may be positioned on a vent line that is distinct from a delivery line that delivers heated liquid from the heater tank to the brew chamber. In the illustrative embodiment of FIG. 3, the beverage forming apparatus 100 includes a vent line 165 fluidly coupled to the heater tank 152. The beverage forming apparatus also includes a delivery line 156 that connects the heater tank 152 to the brew chamber 11 (in some embodiments, the delivery line 156 may include a conduit 156a). As seen in FIG. 3, the vent line 165 and the delivery line 156 are separate and distinct lines, such that fluid passing through the delivery line 156 does not pass through vent line 165, and vice versa. In addition, in this embodiment the vent line and delivery line do not branch from a common line (except the heater tank itself) upstream from the lines.

The vent valve 155 serves to control flow of fluid through vent line 165. In the embodiment shown in FIG. 3, the vent valve is positioned on the vent line 165, and not on the delivery line 156 or on any line upstream from the delivery line.

Figure 4:
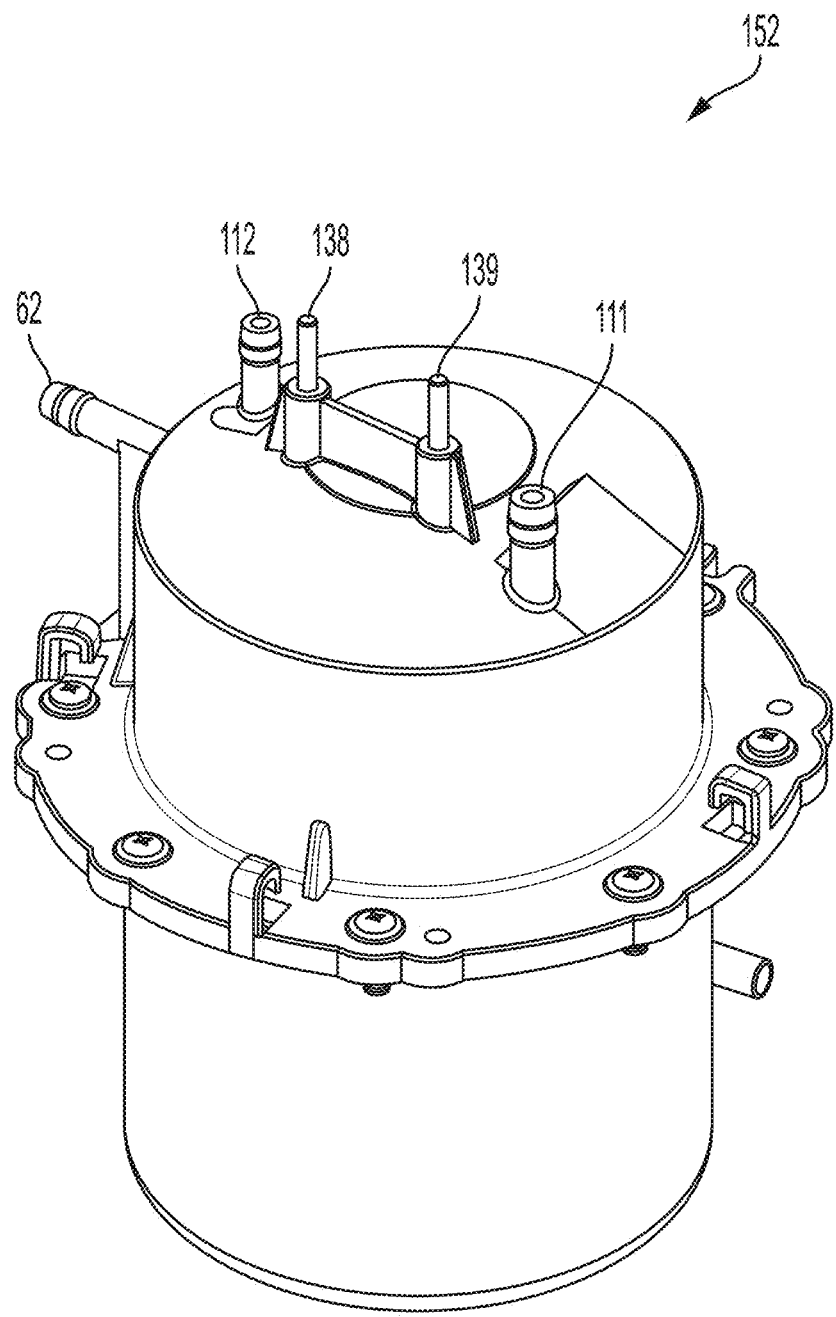
FIG. 4 is a front perspective view of a heater tank in an illustrative embodiment.
Figure 5:
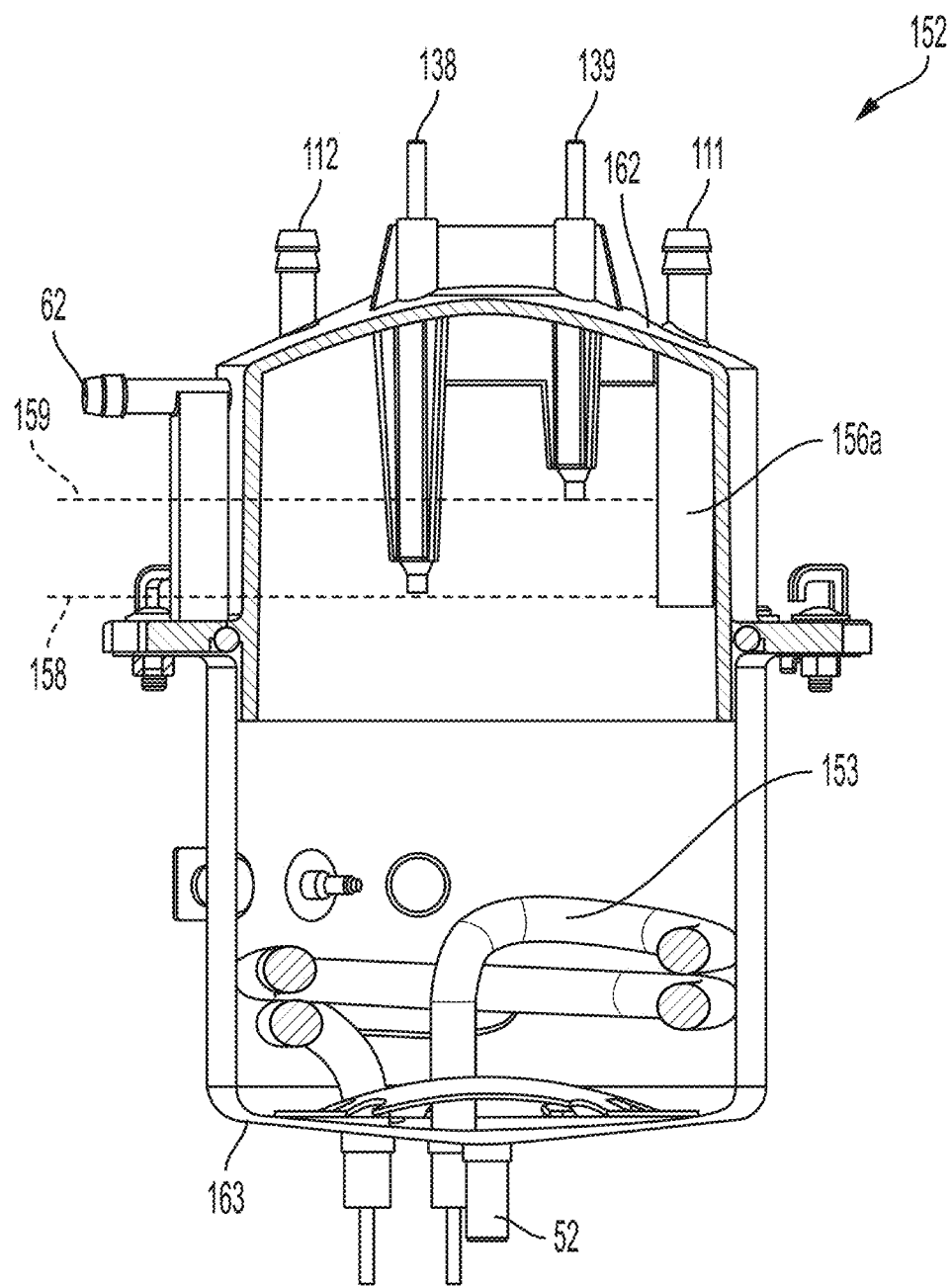
FIG. 5 is a front view of the heater tank of FIG. 4 with a portion of the heater tank cut away to reveal internal components of the heater tank.

An illustrative embodiment of a heater tank 152 is shown in FIGS. 4-5. As shown in the cutaway view of FIG. 5, the heater tank may include a water inlet 52, an air pump inlet 62 and a heating element 153. The heater tank may also include a level sensor 138 associated with a post-dispense level 158, and a level sensor 139 associated with the dispense level 159. In some embodiments, the heater tank may have a first outlet 111 that leads to the brew chamber and a second outlet 112 that leads to the vent valve, where the first and second outlets are distinct from one another. The first outlet 111 may be part of a delivery line that supplies hot water from the heater tank to the brew chamber, and the second outlet 112 may be part of a vent line that connects the heater tank to a vent outlet.

According to one aspect, at least a portion of the delivery line may extend downwardly from the top of the heater tank to a location between the top and the bottom of the heater tank.

In the illustrative embodiment shown in FIGS. 3 and 5, the delivery line 156 may include a conduit 156a that may extend into the heater tank 152. The conduit 156a may extend downwardly from a top or upper portion 162 of the tank to a location between the top 162 and bottom 163 of the tank 152. In this embodiment, the volume of liquid delivered to the brew chamber 11 is equal to the volume in the tank 152 between the liquid delivery level 159 and a post-delivery level 158 at a bottom of the conduit 156a. Note that while only one liquid dispense level 159 is shown, two or more liquid dispense levels may be used to allow the system to deliver different volumes of liquid to the brew chamber 11. In other embodiments, the delivery line 156 may fluidly communicate with a bottom portion of the heater tank 152, e.g., so that the heater tank 152 is completely or substantially emptied.

A moveable handle of the beverage forming apparatus will now be discussed in greater detail. As discussed above, in some embodiments, the beverage forming apparatus includes a handle that is moveable between an open handle position and a closed handle position to open and close the lid of the brew chamber. According to one aspect, the vent valve may be coupled to the handle such that movement of the handle from the closed handle position toward the open handle position opens the vent valve, and movement of the handle from the open handle position toward the closed handle position closes the vent valve.

Figure 6:
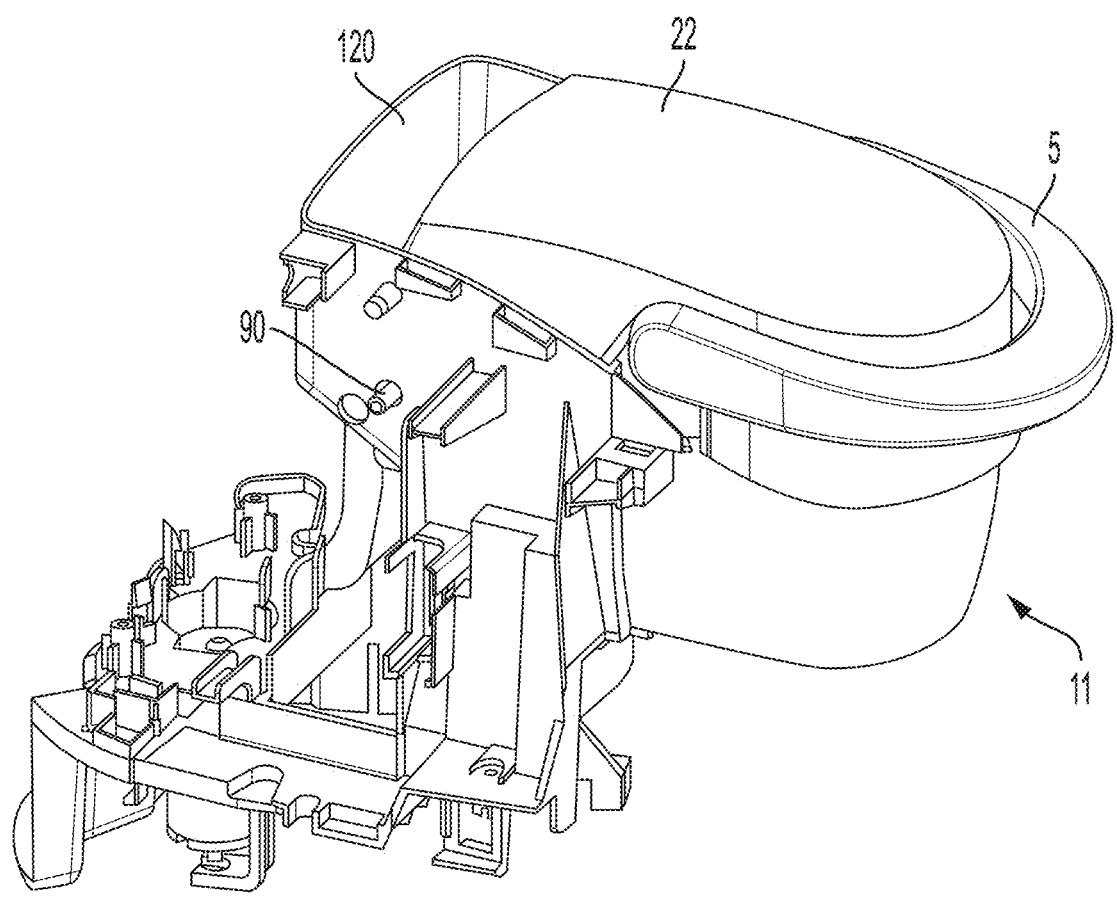
FIG. 6 is a front, left side perspective view of a frame, brew chamber and handle of a beverage forming apparatus in an illustrative embodiment.
Figure 7:
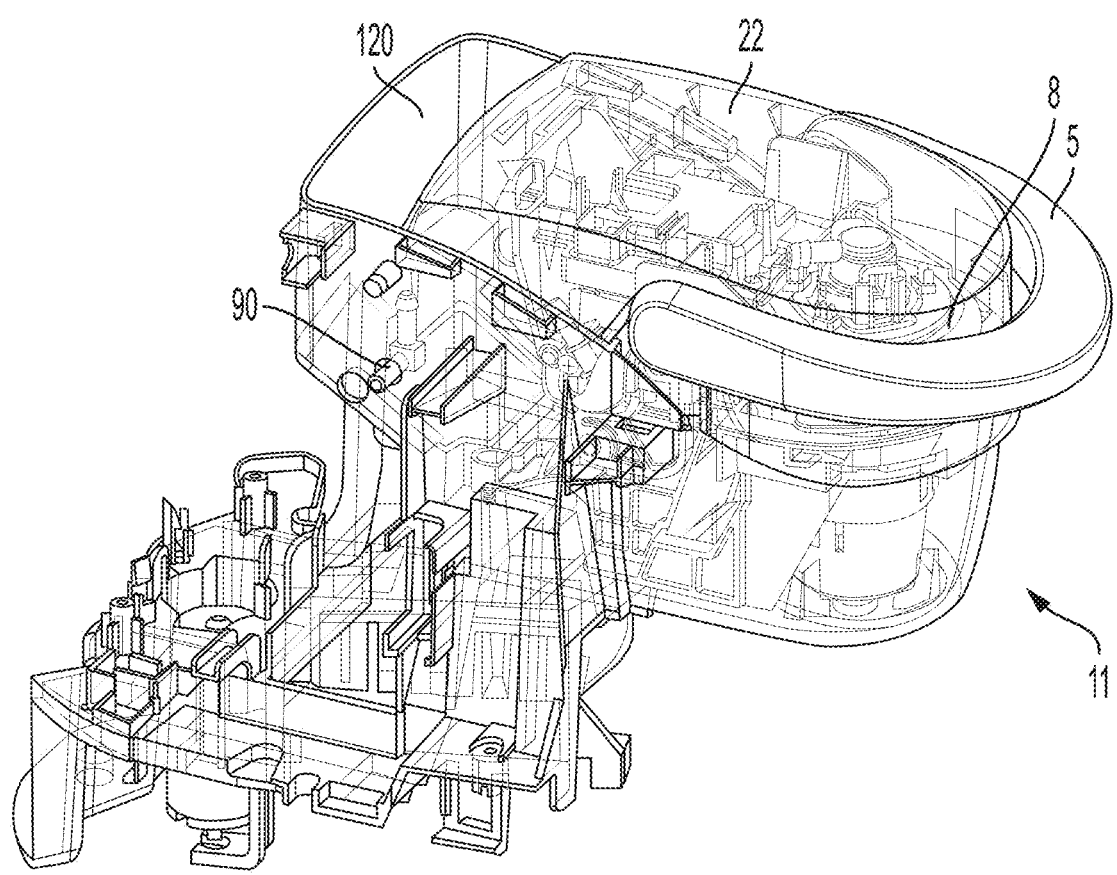
FIG. 7 is the front, left side perspective view of the FIG. 6 embodiment with the frame and cover shown in phantom.

One illustrative embodiment of a beverage forming apparatus having a moveable handle is shown in FIGS. 6-16. As shown in FIG. 6, the beverage forming apparatus includes a handle 5. The beverage forming apparatus also includes a brew chamber 11 that may be adapted to receive a beverage cartridge. The brew chamber 11 may be at least partially covered by a shell 120. The brew chamber 11 may have a cover 22 that may serve as an outer housing for the brew chamber lid 8, which can be seen in FIG. 7. In FIG. 7, the cover 22 is shown in phantom to reveal the brew chamber lid 8 beneath. In some embodiments, the cover 22 is fixed or otherwise attached to the brew chamber lid 8 such that the cover 22 moves with the brew chamber lid 8.

Figure 8:
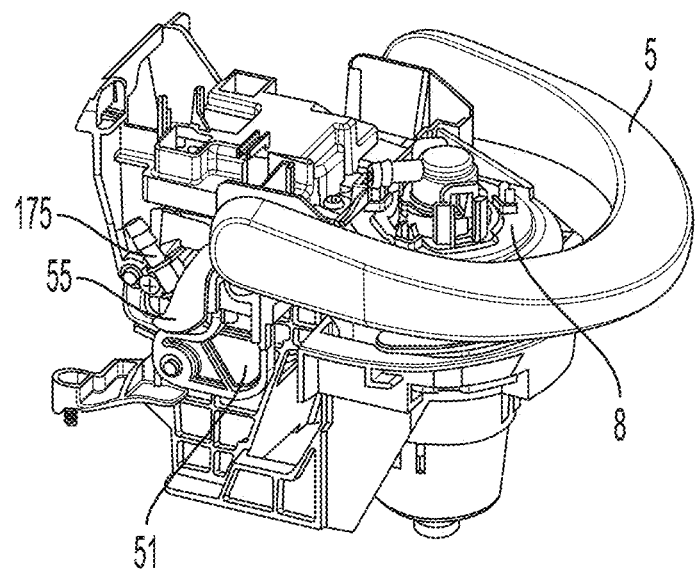
FIG. 8 is the front, left side perspective view of the FIG. 7 embodiment with the frame and cover hidden from view to reveal a vent outlet of a vent valve and a brew chamber lid beneath.

The brew chamber lid 8 is more clearly visible in FIG. 8, in which the cover 22 and the housing shell have been hidden from view. As also seen in FIG. 8, the handle 5 may include an extension portion 55, which may interact with a linkage 51.

According to one aspect, at least a portion of the vent valve may be attached to the handle for movement with the handle. In some embodiments, the at least a portion of the vent valve may be a valving element, which is the moveable feature of the vent valve that opens and closes the vent valve in order to allow, prevent or otherwise control the flow of fluids through the vent valve.

Figure 9:
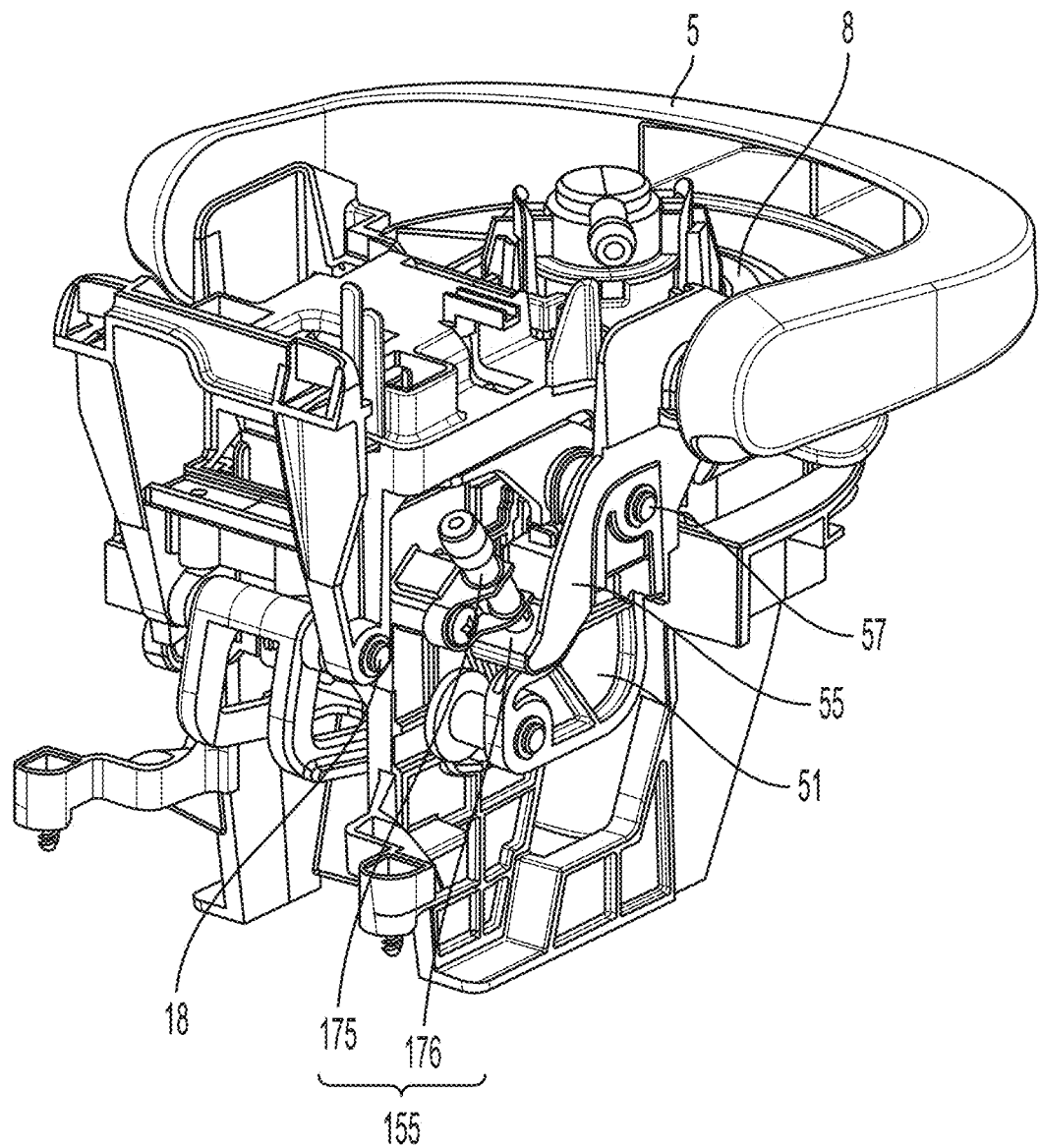
FIG. 9 is a rear, left side perspective view of the FIG. 8 embodiment showing a vent valve, including a vent outlet and a valving element.

In the embodiments shown in FIG. 9, which depicts a rear perspective view of a beverage forming apparatus, the beverage forming apparatus includes a vent valve 155 including a vent outlet 175 and a valving element 176 in the form of a moveable seal. The valving element 176 may move relative to the vent outlet 175 to open and close the vent valve 155. When the valving element 176 is in a position that contacts and covers the vent outlet 175 to seal the outlet closed, the vent valve 155 is closed. When the valving element 176 moves away from being in a position that contacts and covers the vent outlet 175, the vent valve 155 is opened. The vent outlet 175 and valving element 176 can also be seen in FIG. 14.

Figure 10:
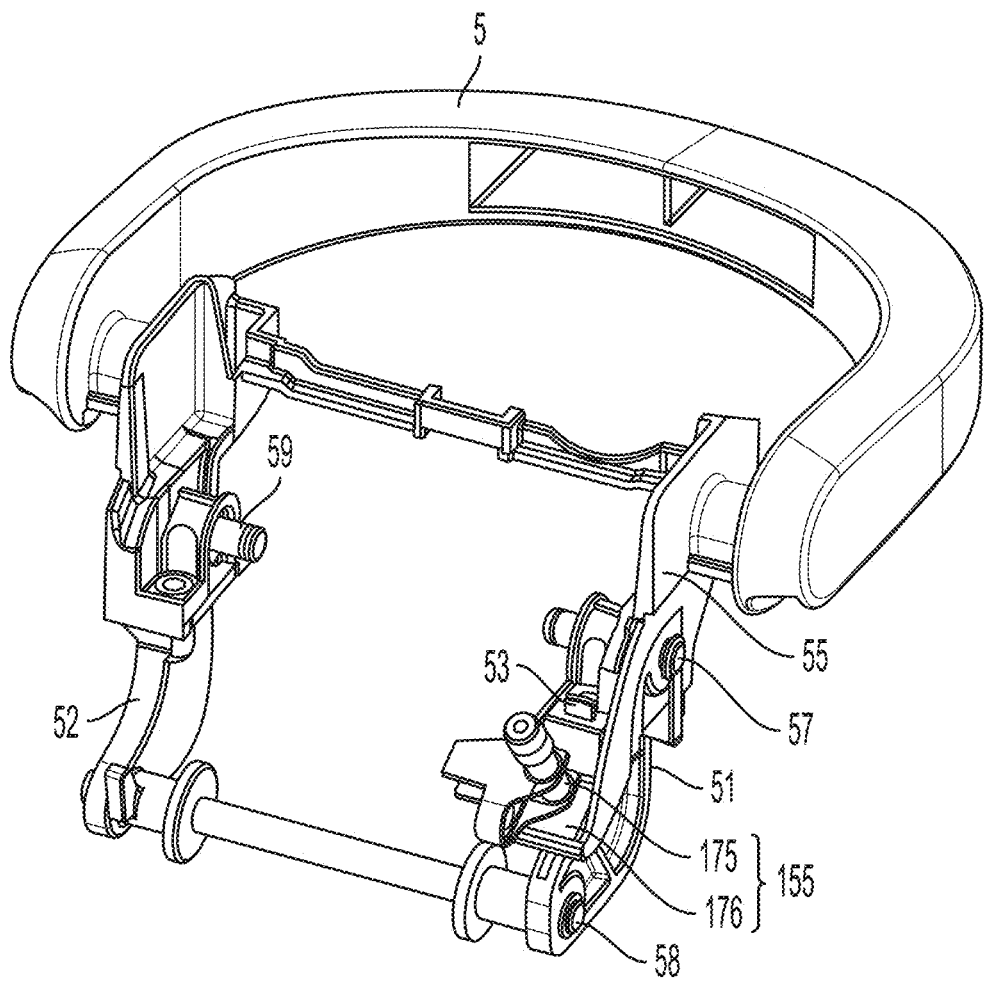
FIG. 10 is a rear, left side perspective view of the FIG. 9 embodiment showing the relationship between the handle, vent outlet, valving element and linkages.
Figure 11:
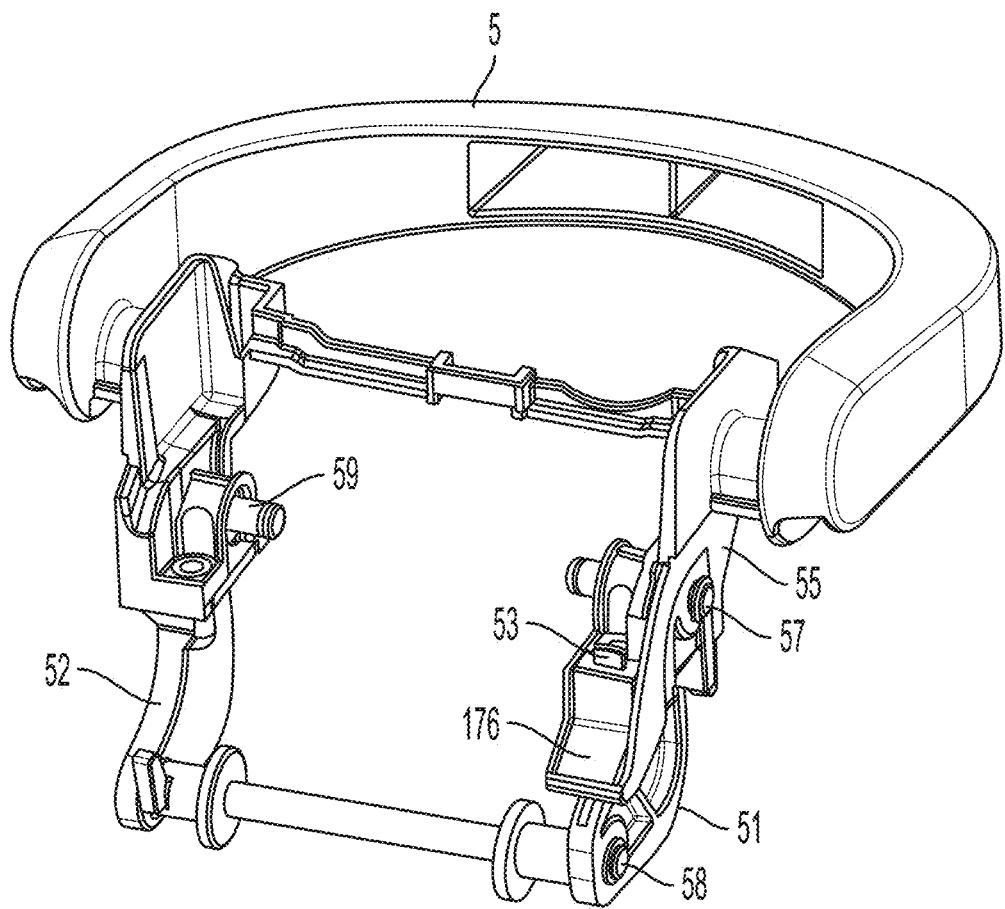
FIG. 11 is the rear, left side perspective view of the FIG. 10 embodiment with the vent outlet hidden from view to reveal more of the valving element beneath.
Figure 12:
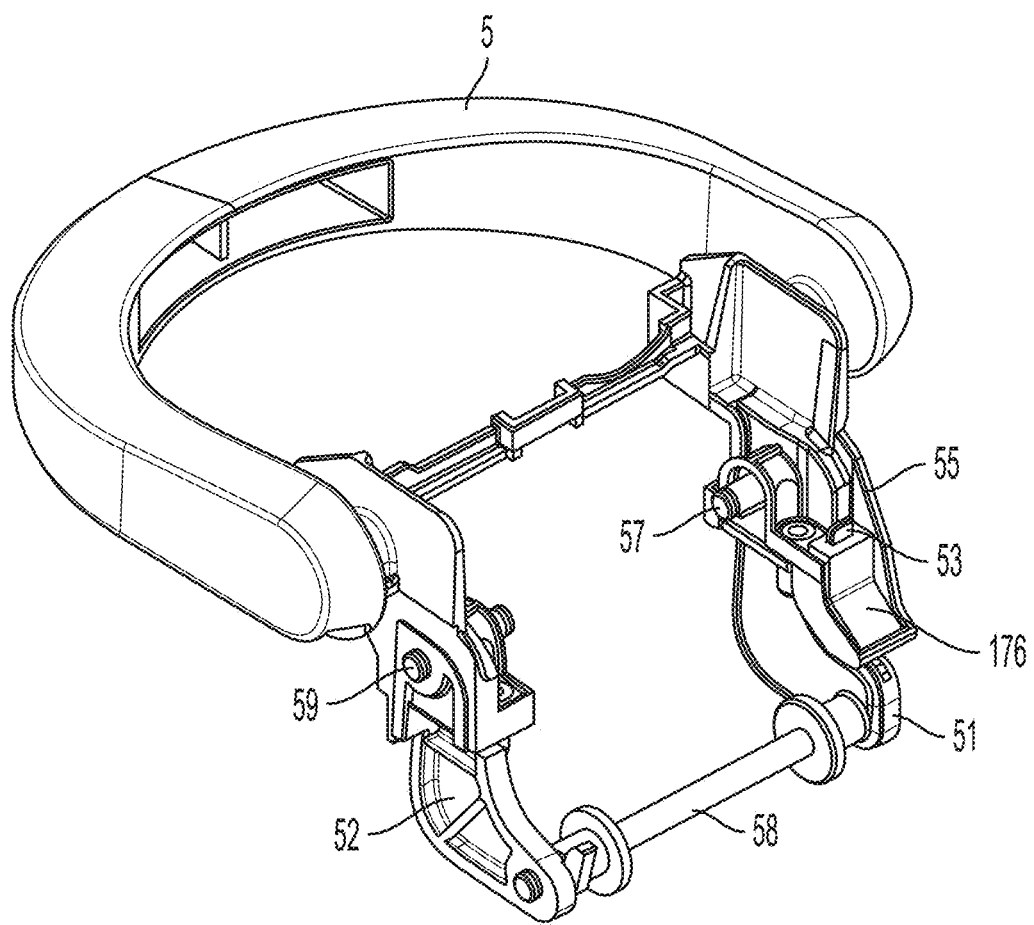
FIG. 12 is a rear, left side perspective view of the FIG. 11 embodiment showing the valving element from a different perspective.
Figure 13:
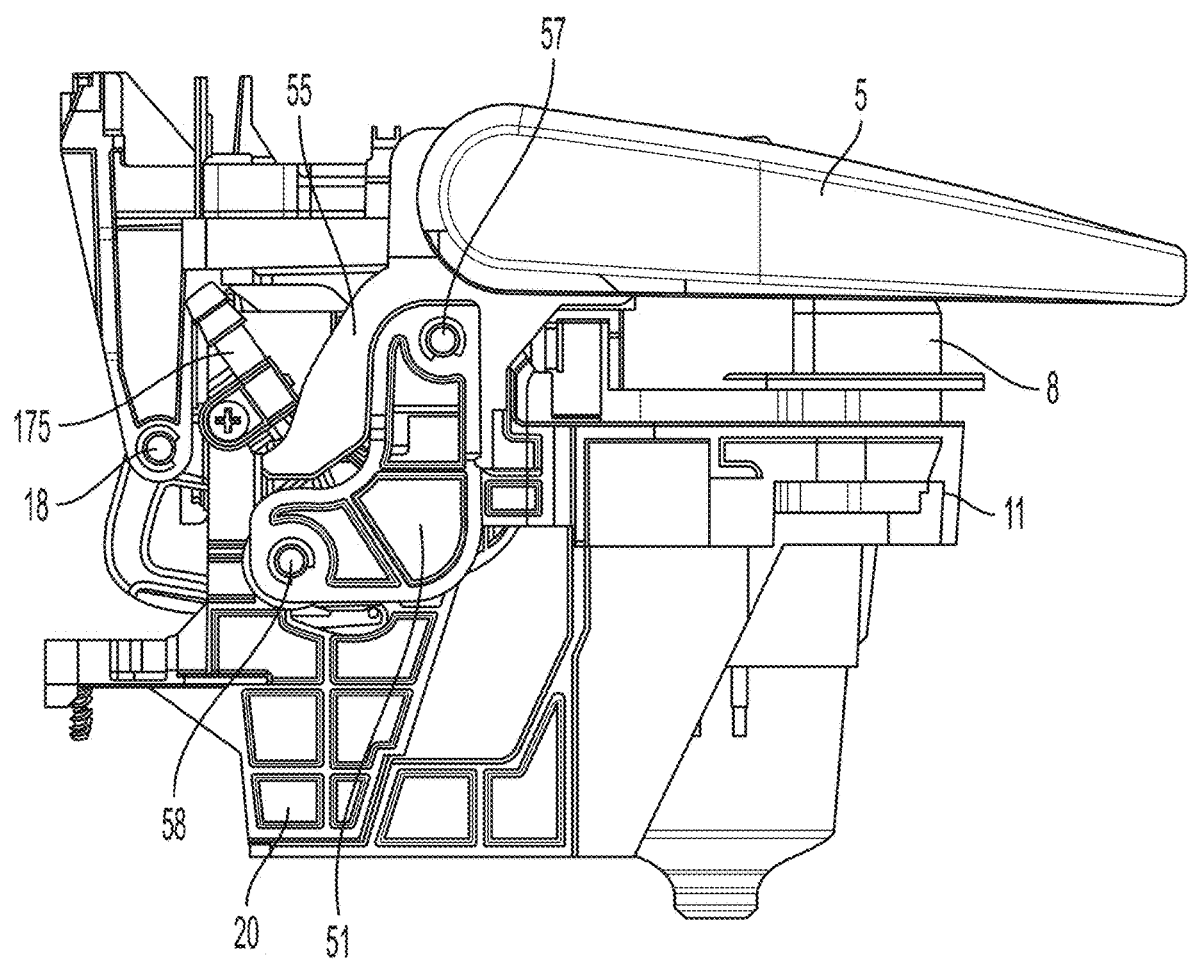
FIG. 13 is a left side view of the FIG. 8 embodiment showing the vent outlet.

As best seen in FIGS. 10-12, in some embodiments, the valving element 176 is attached to the handle 5 for movement with the handle. In some embodiments, the handle 5 may include an extension portion 55, and the valving element 176 is attached to the extension portion 55 of the handle. In some embodiments, the extension portion 55 of the handle 5 may move with the portion of the handle that is actually contacted and moved by a user's hand, such that moving the handle 5 also moves the extension portion 55 by the same amount. As best seen in FIG. 12, the valving element 176 is attached to the extension portion 55. In some embodiments, a stake 53 attached to the handle 5 may extend partially or entirely through the valving element 176 to help attach the valving element 176 to the handle 5.

With the valving element 176 attached to the handle 5, the valving element 176 moves with the handle 5. As a result, moving the handle 5 from a closed handle position to an open handle position may open the brew chamber lid and may move the valving element 176 away from the valve outlet 175, thereby opening the vent valve 155. Moving the handle from an open handle position to a closed handle position may close the brew chamber lid and may move the valving element 176 toward the valve outlet 175 to cover the outlet 175, thereby closing the vent valve 155.

The valving element may attach to the handle by any suitable arrangement, such as via an adhesive, mechanical interlock, interference fit, etc. The valving element may attach to the handle via intermediate components, or may be directly attached to the handle. In some embodiments, the valving element is mechanically coupled to the handle, such as with the embodiment shown in the figures.

Figure 14:
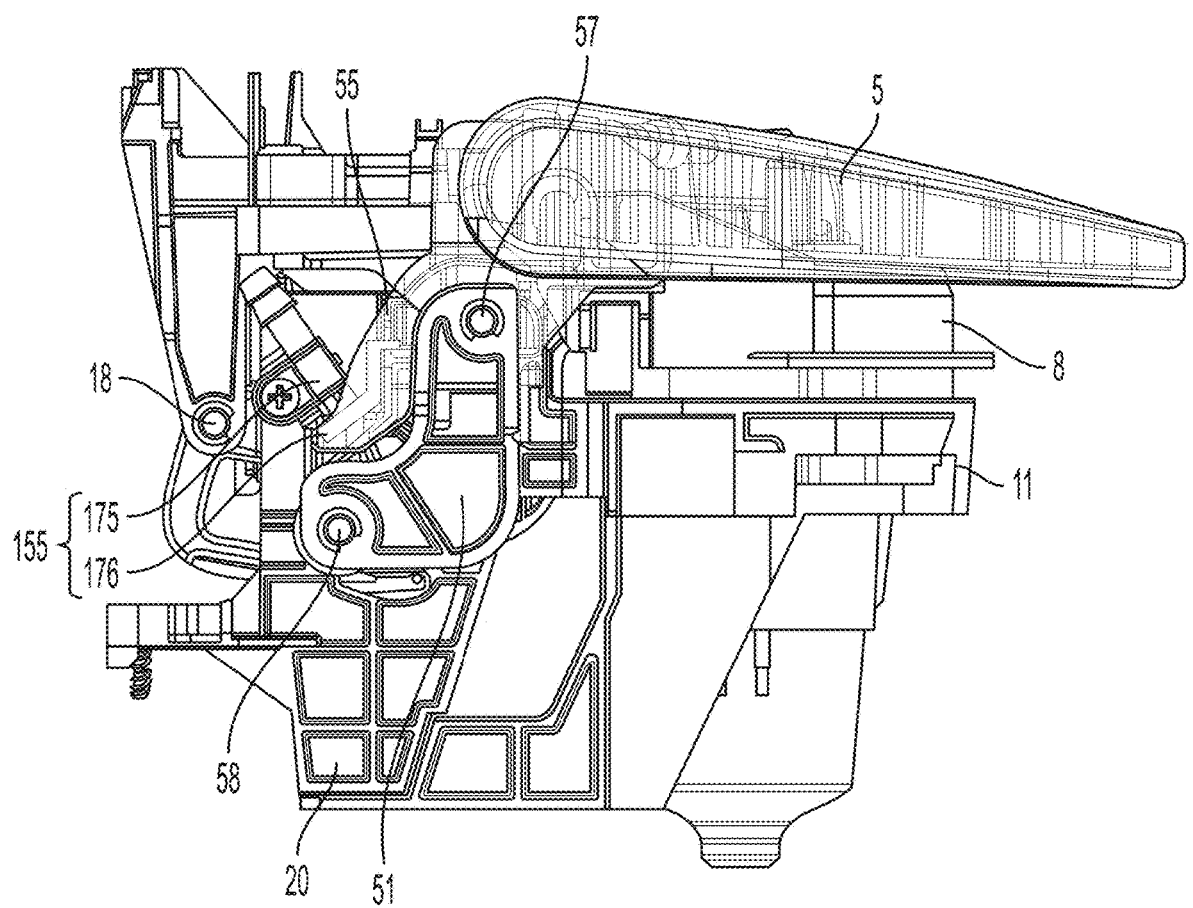
FIG. 14 is the left side view of FIG. 13 with the handle shown in phantom.

In some embodiments, the vent line may be positioned within the beverage forming apparatus such that the vent line vents to an interior of the beverage forming apparatus. The outlet to the vent line may be located with the interior of the beverage forming apparatus. The outlet to the vent line may point downwardly. As seen in FIG. 14, the vent outlet 175 of the vent line is positioned within the interior of the beverage forming apparatus and points downwardly.

Although the embodiment in the figures includes a vent valve having a moveable seal covering and uncovering a valve outlet, it should be appreciated that many other types of valves may be used for the vent valve. The vent valve may be any suitable type of valve, such as a valve that includes a moveable seal (e.g., a gasket), a gate valve, a plug valve, a globe valve, a butterfly valve, a ball valve, a diaphragm valve, a stop cock valve, a pinch valve, a solenoid valve, or any other suitable device configured to control passage of fluid out of an outlet. The valving element may be the moveable feature of any of these types of valves. In some embodiments, as with the embodiment shown in FIGS. 8-16, movement of the valving element may be associated with an operation to open/close the brew chamber lid, such as movement of the handle.

The vent valve may be a manually actuated, pneumatically actuated, hydraulically actuated, and/or an electrically actuated valve.

In some embodiments, the vent valve may be a one-way valve, e.g., only permitting fluid to exit the valve outlet but not enter. In some embodiments, the vent valve may be a two-way or multi-way valve.

In one set of embodiments, the vent valve includes a moveable rigid surface (e.g., a plate) and a valve outlet having a gasket seal, where the moveable rigid surface covers and uncovers the gasket seal on the valve outlet. The rigid surface presses against the gasket seal to form a fluid-tight closure. The rigid surface may be coupled to the handle of the beverage forming apparatus such that movement of the handle from the open handle position to the closed handle position closes the vent valve by pressing the rigid surface against the valve outlet, and movement of the handle from the closed handle position to the open handle position opens the vent valve by moving the rigid surface away from the valve outlet. In some embodiments, one or more mechanical linkages and/or gears between the handle and the rigid surface may transmit motion of the handle to motion of the rigid surface. In some embodiments, the rigid surface is fixed or otherwise attached to the handle for movement with the handle.

In one set of embodiments, the vent valve comprises a pinch valve that may include a valving element in the form of a pinching device that is arranged to clamp down on tubing to stop fluid flow through the tubing. In some embodiments, the pinching device of the pinch valve may clamp down on a portion of the vent line. In some embodiments, the pinch valve includes a section of tubing, also called a sleeve, that connects to the vent line. The tubing that is pinched by the pinching device may have resilient properties that allow it to withstand being pinched closed and then released without significant inelastic deformation. The pinching device of the pinch valve may be coupled to the handle of the beverage forming apparatus such that movement of the handle from the open handle position to the closed handle position closes the pinching device, and movement of the handle from the closed handle position to the open handle position opens the pinching device. In some embodiments, one or more mechanical linkages and/or gears between the handle and the pinching device may transmit motion of the handle to motion of the pinching device.

In one set of embodiments, the vent valve comprises a ball valve that may include a valving element in the form of a hollow, pivoting ball that turns within a valve seat to open and close fluid communication through the valve. The hollow ball may be coupled to the handle of the beverage forming apparatus such that movement of the handle from the open handle position to the closed handle position turns the ball to close the valve, and movement of the handle from the closed handle position to the open handle position turns the ball to open the valve. In some embodiments, one or more mechanical linkages and/or gears between the handle and the ball may transmit motion of the handle to motion of the ball.

In one set of embodiments, the vent valve comprises a butterfly valve that may include a valving element in the form of a pivoting disk that turns within a valve seat to open and close fluid communication through the valve. The disk may be coupled to the handle of the beverage forming apparatus such that movement of the handle from the open handle position to the closed handle position turns the disk to close the valve, and movement of the handle from the closed handle position to the open handle position turns the disk to open the valve. In some embodiments, one or more mechanical linkages and/or gears between the handle and the disk may transmit motion of the handle to motion of the disk.

In one set of embodiments, the vent valve comprises a globe valve that may include a valving element in the form of a linearly translating plug that moves relative to a stationary seat to open and close fluid communication through the valve. The plug may be coupled to the handle of the beverage forming apparatus such that movement of the handle from the open handle position to the closed handle position moves the plug toward and into contact with the seat to close the valve, and movement of the handle from the closed handle position to the open handle position moves the plug away from the seat to open the valve. In some embodiments, one or more mechanical linkages and/or gears between the handle and the plug may transmit motion of the handle to motion of the plug.

In one set of embodiments, the vent valve comprises a gate valve that may include a valving element in the form of a linearly translating gate that moves relative to a stationary seat to open and close fluid communication through the valve. The gate may be coupled to the handle of the beverage forming apparatus such that movement of the handle from the open handle position to the closed handle position closes the gate, and thus closes the valve, and movement of the handle from the closed handle position opens the gate and thus opens the valve. In some embodiments, one or more mechanical linkages and/or gears between the handle and the gate may transmit motion of the handle to motion of the gate.

In some embodiments, a sensor may be used to detect movement and/or position of the handle, which may then signal to a controller to move the valving element of the vent valve to open or close the valve. Examples of sensors include a switch (such as a microswitch), a position sensor, a motion sensor, or any other suitable sensor for detecting movement and/or position of the handle.

Opening and closing mechanisms for the brew chamber lid and handle will now be described. In some embodiments, the brew chamber lid pivots about an axis that is different than the pivot axis of the handle.

Figure 15:
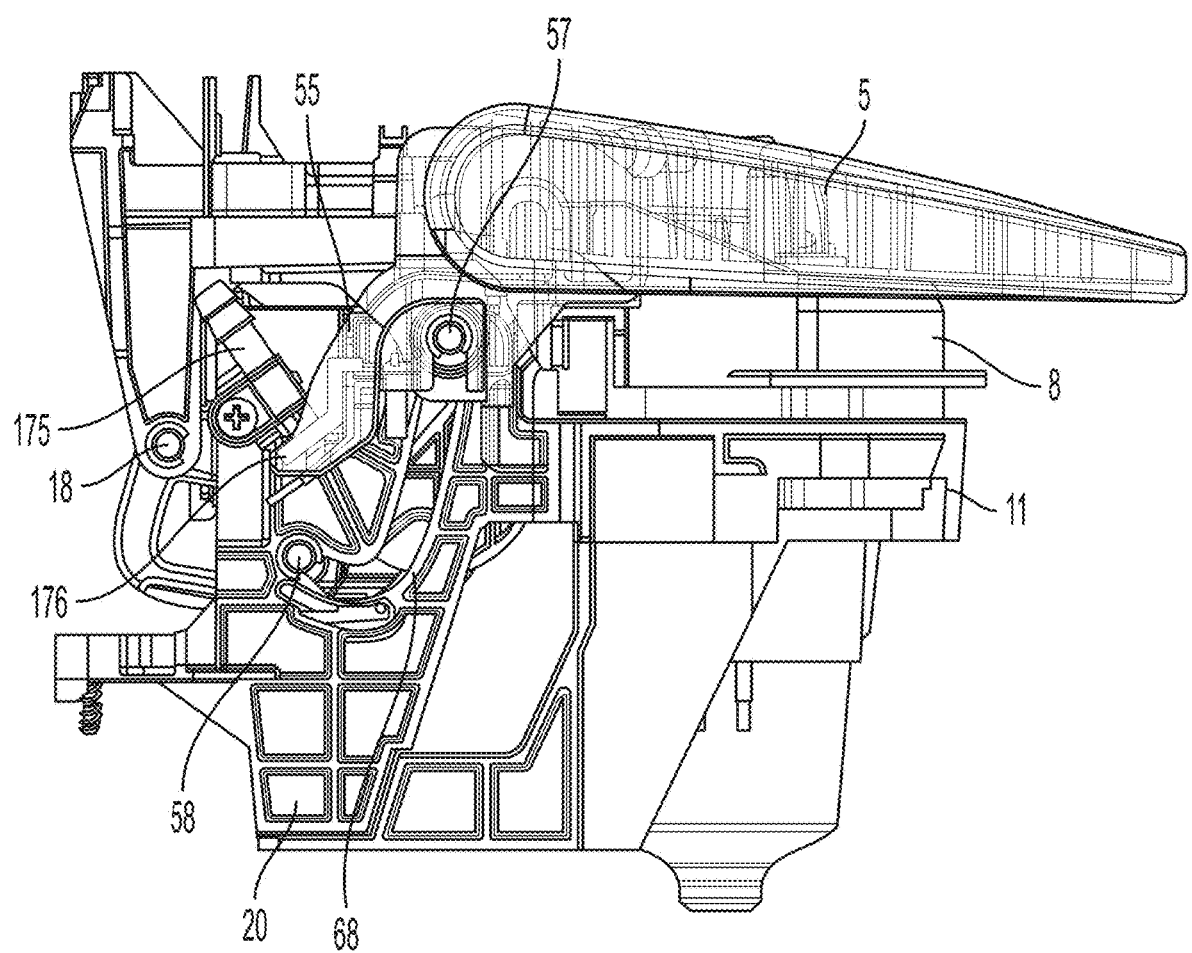
FIG. 15 is the left side view of FIG. 14 with the linkage shown in phantom to show a cam in the form of a slot beneath.
Figure 16:
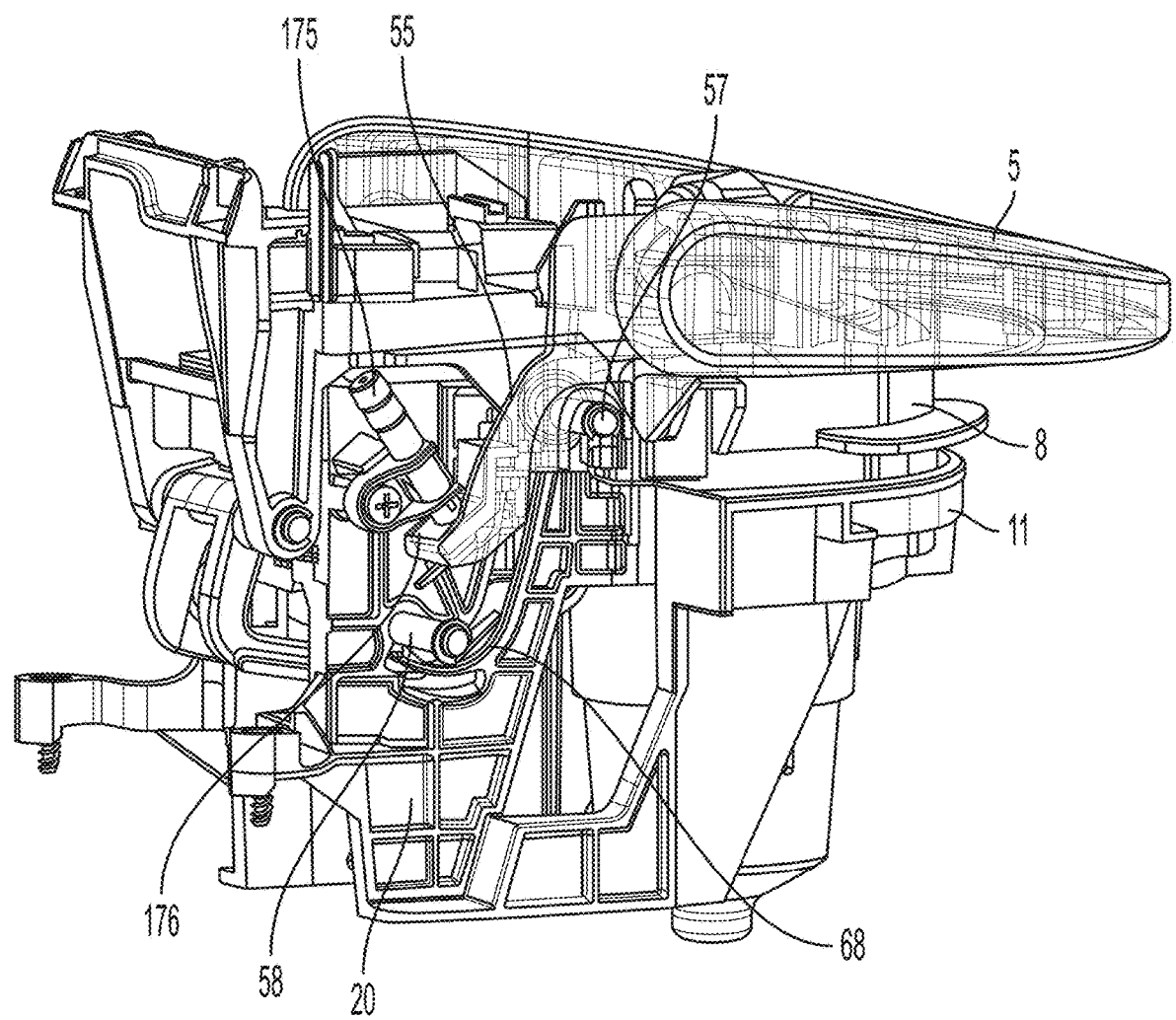
FIG. 16 is a rear, left side perspective view of the FIG. 15 embodiment showing the cam engaged with a cam follower.

One illustrative embodiment of the opening and closing mechanisms for the brew chamber lid and the handle is shown in FIGS. 13-16. In some embodiments, such as that shown in FIG. 13, the brew chamber lid 8 pivots relative to a frame 20 about pivot pin 18. In some embodiments, the handle 5 is coupled to a linkage 51 that couples the handle 5 to a cam follower 58, which may be a pin. As seen in FIGS. 15-16, in which the handle 5, extension portion 55 and linkage are shown in phantom, the cam follower 58 travels along a cam 68 in the form of a J-shaped slot, which may be formed into the frame 20. Movement of the pin 58 along slot 68 may serve to guide movement of the handle as the handle moves between the open handle position and the closed handle position. As seen in FIGS. 10-12, a second linkage 52 may be located on the other side of the assembly. The second linkage 52 may also serve to couple the handle 5 to the cam follower 58.

The handle 5 may be coupled to the brew chamber lid 8 such that movement of the handle from the closed handle position to the open handle position causes the brew chamber lid 8 to move from a closed lid position to an open lid position, and movement of the handle from the open handle position to the closed handle position causes the brew chamber lid 8 to move from an open lid position to a closed lid position. In some embodiments, the handle and the brew chamber lid may be coupled such that moving the handle between the open handle position and closed handle position may cause the brew chamber lid to move with the handle for at least a portion of the movement of the handle. In some embodiments, the brew chamber lid may only begin to move after the handle has been moved past a certain position. For example, when the handle is moved from the closed handle position to the open handle position, the brew chamber lid may remain closed until the handle has moved past a certain point, at which the brew chamber lid may begin to open. Similarly, in another example, when the handle is moved from the open handle position to the closed handle position, the brew chamber lid may remain open fully open until the handle has moved past a certain point, at which the brew chamber lid may begin to close. In some embodiments, some relative movement may occur between the handle and the brew chamber lid. In other words, in some embodiments, while the handle and the brew chamber lid may be coupled to one another, they are not necessarily fixed to one another.

In some embodiments, the handle may be pivotally mounted to the brew chamber lid. In the illustrative embodiment shown in FIGS. 9-10, the handle 5 is pivotally mounted to the brew chamber lid 8 via pins 57 and 59.

In some embodiments, although opening and closing of both the vent valve and the brew chamber lid are coupled to the position of the handle, it should be appreciated that opening and closing of the vent valve may be independent of movement of the brew chamber lid. For example, in some embodiments, movement of the brew chamber lid 8 itself may not necessarily cause the vent valve to open or close.

Figure 17:
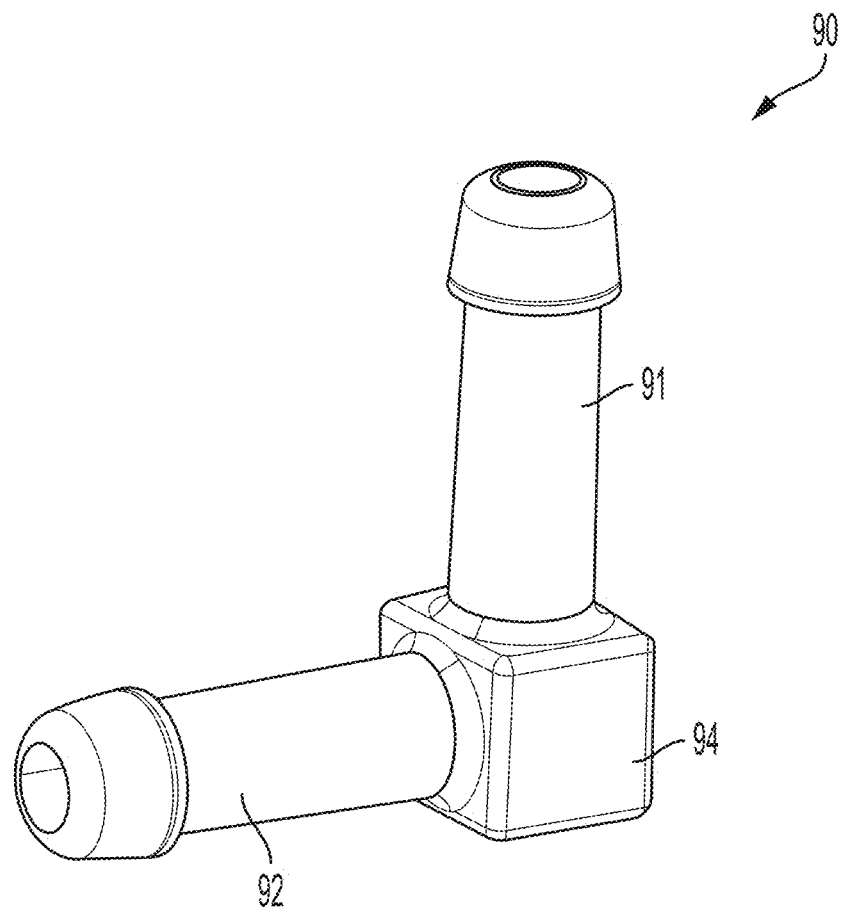
FIG. 17 is a perspective view of an L-shaped connector seen in the embodiment of FIG. 7.

In some embodiments, as seen in FIGS. 6-7, the beverage forming apparatus may include an L-shaped connector 90 that fluidly couples the heater tank to the vent outlet. An enlarged view of the L-shaped connector is shown in FIG. 17. The connector 90 may include two legs 91, 92 that may be joined by a body 94. In some embodiments, the legs 91, 92 may be substantially perpendicular to one another.

In accordance with an aspect of the invention, an air filter 4 is fluidly coupled to the air pump 154 so that pressurized air delivered from the air pump 154 passes through the air filter 4 before entering the heater tank 152. Also, the air filter 4 is fluidly coupled to a permanently open orifice 6 such that fluid vented from the heater tank 152 (e.g., during filling of the tank 152 or heating of liquid) passes through the air filter 4 before passing to the orifice 6. Thus, the air filter 4 has an inlet side arranged to receive air from the air pump 154 and an outlet side arranged to deliver filtered air to the liquid supply system 15 such that the air filter 4 is fluidly positioned in a gas line between the heater tank 152 and the orifice 6. Such an arrangement may help resist passing unwanted materials from the air pump 154 to the heater tank 152. For example, if the air pump 154 draws in dust from ambient air, the dust may be removed from the air flow to the tank 152 by the filter 4. This may help keep such materials from being introduced into the water or other liquid in the heater tank 152. In addition, or alternately, the filter 4 may help resist the passage of moisture or other unwanted materials to the air pump 154 and/or the orifice 6. For example, the orifice 6 and the air filter 4 may be fluidly coupled to an upper portion of the heater tank 152 by a gas line 61 attached at or near a top of the heater tank 152. The heater tank 152 may have a gas or vapor space such that water heated in the heater tank 152 may produce water vapor that flows from the heater tank 152 to air filter 4 and then to the orifice 6. Also, unwanted particles, such as portions of scale formed in the heater tank 152 may pass from the heater tank 152 to the air filter 4. Water vapor may cause problems such as contaminating portions of the air pump 154, encouraging mold or other growth, etc., and articles in the fluid flow from the heater tank 152 may clog the orifice 6. The air filter 4 may be arranged to resist the flow of water vapor and/or other materials (such as scale particles) through the air filter 4, and thus help prevent the movement of water vapor to the air pump 154 and/or clogging of the orifice 6.

It should be appreciated that use of an air filter fluidly positioned between a heater tank and a permanently open orifice may be employed in embodiments that do not use an air pump to deliver liquid from the heater tank 152 to the brew chamber 11. Instead, an orifice 6 may be used to vent the heater tank 152 and the air filter 4 used to filter fluid that may pass from the tank 152 to the orifice 6 even though liquid may move from the heater tank 152 in other ways, such as by operating the liquid pump 151, by gravity, etc.

Figure 18:
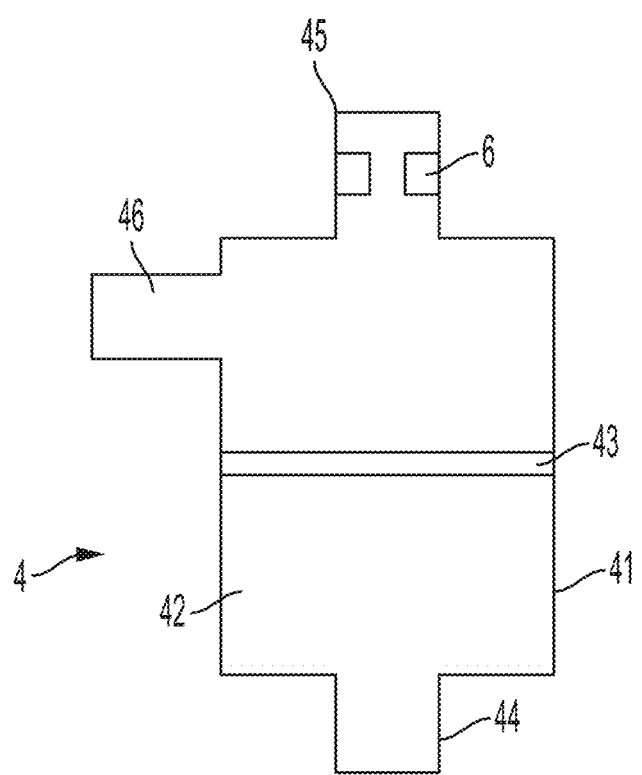
FIG. 18 is a cross sectional view of an integrated air filter and orifice assembly.

In some embodiments, the air filter 4 and the orifice 6 may be incorporated into a single part. For example, as shown in FIG. 18, a housing 41 may define an internal space 42 in which an air filter element 43 is located. The air filter element 43 may be or include a porous filter paper, e.g., made of woven or non-woven cellulose or polymer fibers, or any other suitable component or components. The housing 41 may have an inlet port 46 fluidly coupled to the inlet side of the air filter element 43 and an inlet side of the orifice 6, an outlet port 45 coupled to an outlet side of the orifice 6 (an upper side of the orifice 6 in FIG. 18), and a common port 44 coupled to the outlet side of the air filter 43. The common port 44 may be fluidly coupled to the heater tank 152 via a line, e.g., a conduit or gas line 61, such that pressurized air entering the housing 41 via the inlet port 46 from the air pump 154 may pass through the air filter element 143 and flow out of the common port 44 to the heater tank 152. The pressurized air may also flow through the orifice 6 to the outlet port 45, and the outlet port 45 may be fluidly coupled to a line that directs fluid in the line to the ambient environment, a drip tray, a water reservoir or other suitable location. However, the orifice 6 may be suitably sized so that the air pump 154 is capable of delivering air at a suitable flow rate and pressure to cause liquid in the heater tank 152 to move to the brew chamber 11 via the delivery line 156. In some embodiments, the orifice 6 has a size of 0.012 inches.

Forming the air filter 4 and orifice 6 as a single part, e.g., with an integral housing 41 that supports an air filter element 43 and an orifice 6, may simplify assembly and/or operation of the beverage forming apparatus 100, as well as potentially reduce costs. In some embodiments, the filter element 43 and the orifice 6 element may be co-molded or otherwise secured to, or formed at the same time as, the housing 41. In other embodiments, one of the filter element 43 or orifice 6 element may be co-molded, formed unitarily with, or otherwise attached to the housing 41 or a portion of the housing 41, and the housing 41, filter element 43 and orifice 6 may be later assembled together. For example, the orifice 6 may be molded as part of an upper housing 41 section, and the filter element 43 may be attached to a lower housing 41 section that is made separately from the upper housing 41 section. The upper and lower sections may be assembled together, e.g., at a portion of the housing 41 between the filter element 43 and the orifice 6, so that the air filter 4 and orifice 6 are integrated into a single part.

In the embodiment of FIG. 3, the liquid supply 15 provides liquid to the tank 152 via a liquid pump 151 that is coupled to a source W. The source W may have any suitable arrangement, e.g., may provide liquid from a storage tank or reservoir like that shown schematically in FIG. 3, a mains water supply or other source. Thus, in some cases, the liquid provided to the tank 152 may vary in temperature by a wide degree depending on various factors, such as time of year, a temperature of a room in which the beverage forming apparatus 100 is located, etc. For example, if the source W is a reservoir that is filled by a user, the temperature of liquid in the reservoir may vary between room temperature (e.g., if liquid sits in the reservoir for an extended time) and a cooler temperature (e.g., if the reservoir has just been filled with water that is dispensed from a tap).

To provide liquid to the tank 152 in this embodiment, the liquid pump 151 is controlled by the control circuit 16 to provide a desired volume of liquid to the tank 152. For example, if the tank 152 is empty or at the post-dispense level 158, the liquid pump 151 may be operated until a conductive probe or other liquid level sensor provides a signal to the control circuit 16 that indicates when liquid arrives at the dispense level 159. In other embodiments, the liquid pump 151 may be arranged to provide a specified volume of liquid, e.g., the liquid pump 151 may be a piston pump, diaphragm pump, syringe pump or other type of pump that delivers a known volume of liquid for each pump stroke or other operation such the control circuit 16 can cause the liquid pump 151 to operate a specified number of cycles or a specified time to deliver a desired volume of liquid. Alternately, the system may include a flow meter or other device to detect liquid flow from the liquid pump 151 and thereby determine a volume of liquid delivered to the heater tank 152. This information may be used to control the liquid pump 151 to stop when a desired amount of liquid has been delivered.

Although in this embodiment a liquid level sensor is used including a conductive probe capable of contacting liquid in the tank 152 and providing a signal (e.g., a resistance change) indicative of liquid being present at respective dispense level 159 in the tank 152, a liquid level sensor may be arranged in other ways. For example, the sensor may include a microswitch with an attached float that rises with liquid level in the tank 152 to activate the switch. In another embodiment, the liquid level sensor may detect a capacitance change associated with one or more liquid levels in the tank, may use an optical emitter/sensor arrangement (such as an LED and photodiode) to detect a change in liquid level, may use a pressure sensor, may use a floating magnet and Hall effect sensor to detect a level change, and others. Thus, a liquid level sensor is not necessarily limited to a conductive probe configuration. Moreover, the liquid level sensor may include two or more different types sensors to detect different levels in the tank. For example, a pressure sensor may be used to detect liquid at one dispense level (e.g., complete filling of the tank 152 may coincide with a sharp rise in pressure in the tank 152 that is detected by the pressure sensor), while a conductive probe may be used to detect liquid at another dispense level, such as dispense level 159.

In accordance with an aspect of the invention, a pressure relief valve may be provided between the liquid pump and the heater tank. This positioning, optionally in combination with other machine features, may provide various advantages. For example, positioning the pressure relief valve upstream of the heater tank 152 may allow the pressure relief valve to vent to a location at which a user has access, but with reduced concern for discharging hot water from the pressure relief valve. That is, pressure in the heater tank 152 (possibly caused by heating of liquid in the tank 152) may cause the pressure relief valve 7 to open to release pressure in the supply line 71 between the liquid pump 151 and the heater tank 152. However, since the pressure relief valve 7 is located in the supply line 71, which contains unheated liquid, and is in fluid communication with a lower portion of the heater tank 152, which has water at a lower temperature than other portions of the heater tank 152, fluid released by the pressure relief valve 7 may be at a relatively low temperature. In some embodiments, as in FIG. 3, the pressure relief valve 7 may vent to a drain line 72 that expels liquid into the water reservoir W. However, the pressure relief valve 7 may vent to other locations to which a user has access, such as at a drip tray, or to other locations not accessible by a user, such as at a location internal to the housing 17.

In accordance with another aspect of the invention, the pressure relief valve may be arranged so that an opening pressure at which the pressure relief valve vents pressure from the supply line may be less than a maximum pressure that the liquid pump can produce in the supply line. With this configuration, the pressure relief valve may open only during high pressure events that are unrelated to liquid pump operation. This may help the system ensure that the heater tank 152 is suitably filled with water or other liquid during a fill operation. That is, the liquid pump 151 may produce a relatively high pressure to force water into the heater tank 152, yet the pressure relief valve 7 will not open to vent pressure from the supply line 71. Pressure in the heater tank 152, and consequently in the supply line 71, may be vented by the orifice 6, allowing the heater tank 152 to fill with liquid without forcing liquid to flow out via the delivery line 156. (The check valve 157 may have a crack, or opening, pressure at which the check valve 157 permits flow to the brew chamber 11 that is higher than a maximum pressure the liquid pump 151 can produce in the heater tank 152.) Rather than opening because of pressure created by the liquid pump 151, the pressure relief valve 7 may open for other reasons, such as unusually high pressures created by the air pump 154 or pressure generated by heating liquid in the heater tank 152. In some embodiments, the pressure relief valve 7 may open or vent pressure at a pressure that is less than a crack or opening pressure of the check valve 157. In this way, pressure in the heater tank 152 can be vented as necessary via the pressure relief valve 7 (and the orifice 6) rather than causing flow of liquid to the brew chamber 11. In other embodiments, the pressure relief valve 7 may have an opening pressure that is higher than the opening pressure of the check valve 157. This may allow liquid to be directed from the heater tank 152 to the brew chamber 11 when the air pump 154 pressurizes the tank 152 without releasing liquid from the pressure relief valve 7. In this embodiment, the pressure relief valve 7 has a fixed opening pressure, although in other embodiments the pressure relief valve 7 may have a variable or controllable opening pressure, e.g., which may be controlled by the control circuit 16. Also provided in this embodiment is a check valve 73 between the pressure relief valve 7 and the liquid pump 151. This check valve 73 may permit flow from the pump 151 to the heater tank 152, but resist flow from the heater tank 152 to the pump 151. This may help ensure that pressure vented by the pressure relief valve 7 is vented by the pressure relief valve 7 and not through the pump 151.

Liquid in the tank 152 may be heated by way of a heating element 153 whose operation is controlled by the control circuit 16 using input from a temperature sensor or other suitable input. Of course, heating of the liquid is not necessary, and instead (or additionally) the apparatus 100 may include a chiller to cool the liquid, a carbonator to carbonate the liquid, or otherwise condition the liquid in a way that alters the volume of liquid in the tank 152. (Generally speaking, components of the liquid supply 15 that heat, cool, carbonate or otherwise condition liquid supplied to the brew chamber 11 are referred to as a "liquid conditioner.")

The brew chamber 11 may use any beverage making ingredient, such as ground coffee, tea, a flavored drink mix, or other beverage medium, e.g., contained in a cartridge 1 or not. Alternately, the brew chamber 11 may function simply as an outlet for heated, cooled or otherwise conditioned water or other liquid, e.g., where a beverage medium is contained in the container 2. Once liquid delivery from the tank 152 to the station 11 is complete, the air pump 154 (or other air pump) may be operated to force air into the delivery line 156 to purge liquid from the brew chamber 11, at least to some extent.

Operation of the liquid pump 151, air pump 154 and other components of the apparatus 100 may be controlled by the control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions.

Prior to forming a beverage, the beverage forming apparatus 100 operates to suitably fill the heater tank 152 to the dispense level 159 (or to one of the dispense levels if more than one is used). To do so, the liquid pump 151 under the control of the control circuit 16 draws water from the reservoir W, which may be a cold water tank, a plumbed supply, etc. Optionally, the water may be filtered prior to entering the inlet of the liquid pump 151. The liquid pump 151 pumps water into the supply line 71, causing water to flow through the check valve 73 and the pressure relief valve 7 and to the heater tank 152. As water is forced into the heater tank 152, the liquid level in the tank 152 rises and air or other gas is forced out of the heater tank 152 and into the gas line 61. This causes air or other gas (such as water vapor) to flow through the air filter 4 and out of the orifice 6. If the vent valve 155 is open, e.g., because the handle 5 and/or brew chamber lid 8 are moved from the closed position, air or other gas may exit the heater tank 152 via the vent valve 155 as well. However, during filling of the heater tank 152, the pressure relief valve 7 may not open to vent pressure in the supply line 71, and the check valve 157 in the delivery line 156 may not open to permit flow to the brew chamber 11. Instead, the orifice 6 and the liquid pump 151 may be arranged to deliver water or other liquid to the heater tank 152 at a pressure and flow rate, and to vent air or other gas from the heater tank 152, such that pressure in the delivery line 156 and the supply line 71 do not cause the check valve 157 or the pressure relief valve 7 to open. In some embodiments, the liquid pump 151 may be incapable of creating sufficient pressure in the heater tank 152 to cause the pressure relief valve 7 or the check valve 157 to open, even if the orifice 6 is clogged or otherwise closed to vent air or other gas from the heater tank 152.

Liquid is delivered to the heater tank 152 by the liquid pump 151 until a desired volume is present in the heater tank 152, e.g., determined by the control circuit 16 when the liquid level in the tank 152 reaches the dispense level 159 as detected by a conductive probe, optical sensor, pressure sensor, timed operation of the liquid pump 151, detected volume delivery by a flow meter in the supply line 71, etc. The liquid pump 151 is stopped, and if desired, liquid in the heater tank 152 is heated by the heating element 153 under the control of the control circuit 16. During heating, the liquid and/or gas in the heating tank 152 may expand in volume, and the expanding gas and/or liquid may flow into the gas line 61, though the air filter 4 and out of the orifice 6 to maintain pressure in the heater tank 152 at approximately ambient pressure. However, if the orifice 6 is clogged or otherwise not operating to vent pressure, the pressure relief valve 7 may open if necessary to vent pressure from the supply line 71 and the heater tank 152. In some embodiments, the opening pressure of the pressure relief valve 7 may be less than the opening pressure of the check valve 157 so that pressure in the tank 152 may be vented to the pressure relief valve 7 rather than to the brew chamber 11. This may allow relatively cooler water to be released from the liquid supply 15, rather than relatively warmer water.

With the liquid in the heater tank 152 suitably heated, if desired and as detected by a thermocouple, thermistor, or other temperature sensor linked to the control circuit 16, liquid may be delivered from the heater tank 152 to the brew chamber 11. To do so, the control circuit 16 may turn the air pump 154 on, forcing air into the gas line 61 via the air filter 4. This causes air flow into the heater tank 152, as well as through the orifice 6, and air may pass directly from the air pump 154 to the orifice 6 without passing through the air filter 4. However, the orifice 6 size or other flow restriction characteristic and the flow rate and pressure of the air pump 154 may be arranged such that pressure in the heater tank 152 rises to force liquid to flow into the conduit 156a and into the delivery line 156 even while the orifice 6 vents pressure in the gas line 61. Reverse flow in the supply line 71 is prevented by the check valve 73, and under normal operation where the opening pressure of the pressure relief valve 7 is higher than the opening pressure of the check valve 157, the pressure relief valve 7 may remain closed such that liquid flows through the check valve 157 and to the brew chamber 11. If the opening pressure of the pressure relief valve 7 is lower than the opening pressure of the check valve 157, the pressure relief valve 7 may open during liquid delivery to the brew chamber 11, but the pressure relief valve 7 may provide a restriction to flow so that a relatively small volume of liquid exits via the pressure relief valve 7.

Operation of the air pump 154 is continued by the control circuit 16 until the liquid level in the heater tank 152 drops to the post dispense level 158 or a suitable volume of liquid is otherwise delivered to the brew chamber. In this illustrative embodiment, once the liquid level in the heater tank 152 drops to the post dispense level 158, air is forced into the conduit 156a and the delivery line 156, helping to purge the delivery line 156 of liquid as well as help purge beverage from the brew chamber 11. In some embodiments, a pressure sensor in the tank 152 may detect the drop in pressure in the tank 152 once the liquid level drops to the post dispense level 158 and air is forced into the delivery line 156, causing the control circuit 16 to stop air pump 154 operation, e.g., after a suitable delay to purge the delivery line 156. Alternately, in some embodiments, a drop in pressure in the heater tank 152 may be detected by a reduced load, and thus reduced current draw, at the air pump 154. In cases where the pressure in the heater tank 152 rises to an overpressure level, e.g., while the air pump 154 is running, but the liquid inlet at the brew chamber 11 is clogged or otherwise restricts flow, and the orifice 6 does not vent suitable pressure from the heater tank 152, the pressure relief valve 7 may open to relieve pressure from the heater tank 152. The control circuit 16 may detect this condition, e.g., using a pressure sensor in the liquid supply 15, using a sensor that detects the pressure relief valve 7 opens, etc., and stop operation of the air pump 154. The control circuit 16 may prompt a user to take corrective action, e.g., by displaying a message at the user interface 14, and/or stop operation. Pressure in the heater tank 152 may also be vented if the vent valve 155 is opened by moving the handle 5 and/or brew chamber lid 8 from the closed position.

As noted above, since air from the air pump 154 is passed through the air filter 4 prior to passing to the heater tank 152, possible contaminants in the air, such as dust, may be prevented from being introduced into the heater tank 152. The air filter 4 may also help resist the passage of moisture or other materials from the gas line 61 to the air pump 154 and orifice 6, e.g., when expanding gas or liquid is caused to flow into the gas line 61 during heating in the heater tank 152, or during filling of the heater tank 152 by the liquid pump 151.

Figure 19:
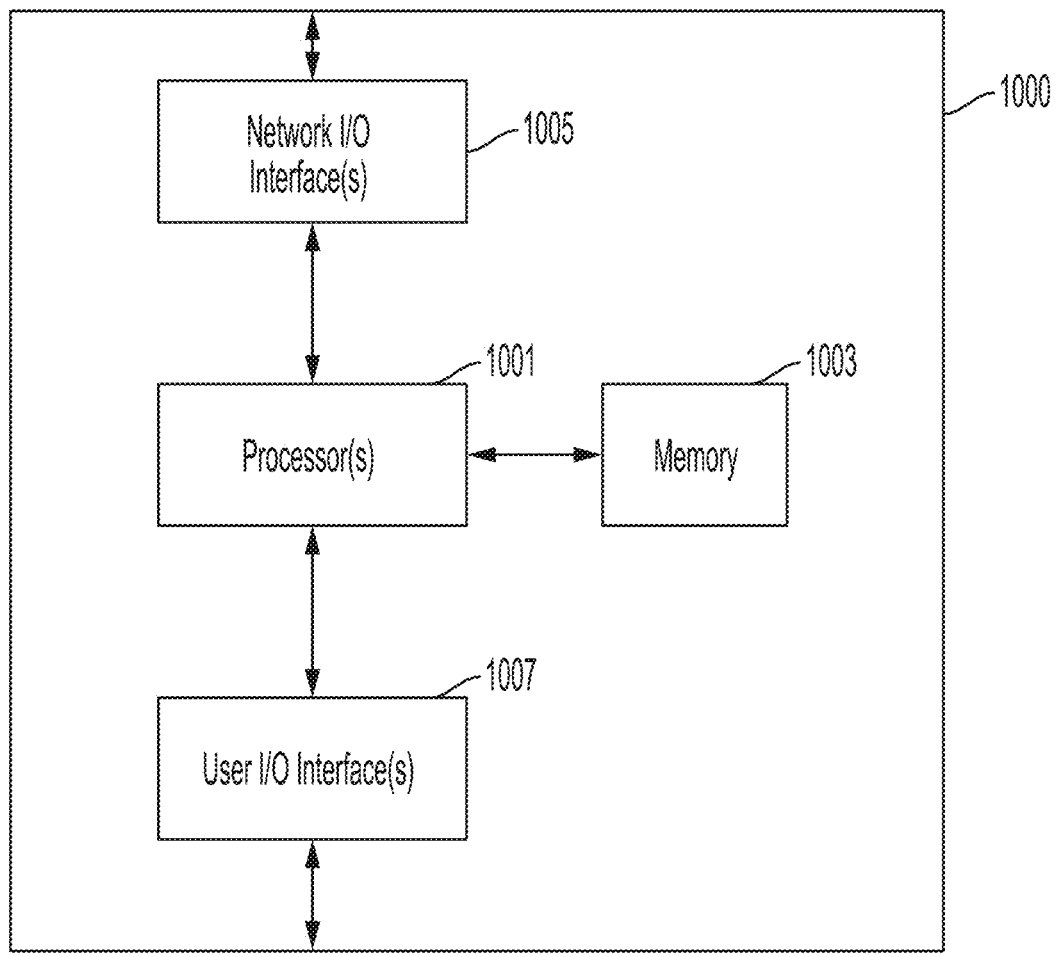
FIG. 19 is a block diagram of an illustrative computing device that may be used to implement a method of forming a beverage.

FIG. 19 is a block diagram of an illustrative computing device 1000 that may be used to implement any of the above-described techniques. Computing device 1000 may include one or more processors 1001 and one or more tangible, non-transitory computer-readable storage media (e.g., memory 1003). Memory 1003 may store, in a tangible non-transitory computer-recordable medium, computer program instructions that, when executed, implement any of the above-described functionality. Processor(s) 1001 may be coupled to memory 1003 and may execute such computer program instructions to cause the functionality to be realized and performed.

Computing device 1000 may also include a network input/output (I/O) interface 1005 via which the computing device may communicate with other computing devices (e.g., over a network), and may also include one or more user I/O interfaces 1007, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above. In some embodiments, a combination of programmable hardware and dedicated hardware may also be used.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage forming apparatus, comprising:
a brew chamber arranged to hold a beverage ingredient, the brew chamber including a liquid inlet to provide liquid for combining with the beverage ingredient to form a beverage and a beverage outlet to allow beverage to exit the brew chamber, and the brew chamber including a lid movable between an open lid position and a closed lid position;
a heater tank having an inlet to receive liquid, a first outlet fluidly coupled to the liquid inlet of the brew chamber via a delivery line to deliver heated liquid from the heater tank to the brew chamber, and a second outlet fluidly coupled to a vent line, the first outlet being distinct from the second outlet, and the vent line being distinct from the delivery line; and
a vent valve arranged to control passage of fluid out of the vent line, wherein opening and closing of the vent valve is based on an operation to move the lid between the open and closed lid positions, and wherein opening and closing of the vent valve is independent of movement of the lid of the brew chamber.

2. The beverage forming apparatus of claim 1, further comprising a handle, wherein the operation to open and close the brew chamber lid comprises moving the handle between an open handle position and a closed handle position to open and close the lid of the brew chamber,
wherein the vent valve is coupled to the handle such that movement of the handle from the closed handle position toward the open handle position opens the vent valve, and movement of the handle from the open handle position toward the closed handle position closes the vent valve.

3. The beverage forming apparatus of claim 2, wherein at least a portion of the vent valve is mechanically coupled to the handle.

4. The beverage forming apparatus of claim 3, wherein the at least a portion of the vent valve moves with the handle.

5. The beverage forming apparatus of claim 4, wherein the at least a portion of the vent valve is fixed to the handle.

6. The beverage forming apparatus of claim 3, wherein:
the vent valve comprises a movable seal,
the vent line includes a vent outlet,
when the vent valve is closed, the seal covers the vent outlet, and
when the vent valve is open, the seal is spaced from the vent outlet.

7. The beverage forming apparatus of claim 1, wherein the vent valve is a manually actuated valve.

8. The beverage forming apparatus of claim 2, further comprising a frame,
wherein:
the vent line includes a vent outlet, and
the lid of the brew chamber and the handle are movable relative to the frame, and the vent outlet is fixed to the frame.

9. The beverage forming apparatus of claim 8, further comprising a linkage coupled to the handle, the linkage including a cam follower, and the frame including a cam cooperating with the cam follower to guide movement of the handle as the handle moves between the open handle position and the closed handle position.

10. The beverage forming apparatus of claim 9, wherein the cam comprises a slot and the cam follower is a pin that is arranged to move along the slot to guide movement of the handle as the handle moves between the open handle position and the closed handle position.

11. The beverage forming apparatus of claim 4, wherein the vent valve includes a valving element, and the at least a portion of the vent valve that moves with the handle is the valving element.

12. The beverage forming apparatus of claim 1, wherein the vent line vents to an interior of the beverage forming apparatus.

13. A beverage forming apparatus, comprising:
- a brew chamber arranged to hold a beverage ingredient, the brew chamber including a liquid inlet to provide liquid for combining with the beverage ingredient to form a beverage and a beverage outlet to allow beverage to exit the brew chamber, and the brew chamber including a lid;
- a handle that is movable between an open handle position and a closed handle position to open and close the lid of the brew chamber, wherein the handle is moveable relative to the lid of the brew chamber;
- a heater tank having a top, a bottom, an inlet to receive liquid, and an outlet fluidly coupled to the liquid inlet of the brew chamber via a conduit to deliver heated liquid from the heater tank to the brew chamber, at least a portion of the conduit extending downwardly from the top of the heater tank to a location between the top and the bottom of the heater tank;
- a vent line fluidly coupled to the heater tank; and
- a vent valve arranged to control passage of fluid out of the vent line, wherein opening and closing of the vent valve is based on an operation to move the lid between the open and closed lid positions, wherein the vent valve comprises a first portion and a second portion, and wherein the first portion of the vent valve is fixed to the handle.

14. The beverage forming apparatus of claim 13, wherein the operation to open and close the brew chamber lid comprises moving the handle between the open handle position and the closed handle position to open and close the lid of the brew chamber,
wherein movement of the handle from the open handle position toward the closed handle position closes the vent valve,
wherein opening and closing of the vent valve is independent of movement of the lid of the brew chamber.

15. The beverage forming apparatus of claim 13, wherein the heater tank includes a second outlet fluidly coupled to the vent line, the second outlet being distinct from the heater tank outlet fluidly coupled to the liquid inlet of the brew chamber.

16. The beverage forming apparatus of claim 13, wherein:
the first portion of the vent valve comprises a movable seal,
the second portion of the vent valve comprises a vent outlet,
when the vent valve is closed, the seal covers the vent outlet, and
when the vent valve is open, the seal is spaced from the vent outlet.

17. The beverage forming apparatus of claim 13, wherein the vent valve is a manually actuated valve.

18. The beverage forming apparatus of claim 13, wherein the first portion of the vent valve comprises a valving element.

19. The beverage forming apparatus of claim 13, wherein the first portion of the vent valve comprises a seal.

20. The beverage forming apparatus of claim 13, wherein the handle comprises an extension portion, and the first portion of the vent valve is fixed to the extension portion.

21. The beverage forming apparatus of claim 13, wherein moving the handle between the open handle position and the closed handle position moves the first portion of the vent valve.

22. A beverage forming apparatus, comprising:
- a brew chamber arranged to hold a beverage ingredient, the brew chamber including a liquid inlet to provide liquid for combining with the beverage ingredient to form a beverage and a beverage outlet to allow beverage to exit the brew chamber, and the brew chamber including a lid;
- a handle that is movable between an open handle position and a closed handle position to open and close the lid of the brew chamber;
- a heater tank having an inlet to receive liquid and an outlet fluidly coupled to the liquid inlet via a delivery line to deliver heated liquid from the heater tank to the brew chamber;
- a vent line fluidly coupled to the heater tank; and
- a vent valve arranged to control passage of fluid out of the vent line, wherein at least a portion of the vent valve is attached to the handle for movement with the handle such that movement of the handle from the closed handle position toward the open handle position opens the vent valve, and movement of the handle from the open handle position toward the closed handle position closes the vent valve,
wherein the movement of the at least a portion of the vent valve attached to the handle is independent of movement of the lid of the brew chamber.

23. The beverage forming apparatus of claim 22, wherein:
the vent valve comprises a movable seal,
the vent line includes a vent outlet,
when the vent valve is closed, the seal covers the vent outlet, and
when the vent valve is open, the seal is spaced from the vent outlet.

24. The beverage forming apparatus of claim 22, wherein the heater tank includes a second outlet fluidly coupled to the vent line, the second outlet being distinct from the heater tank outlet fluidly coupled to the liquid inlet of the brew chamber, and the vent line being distinct from the delivery line.

25. The beverage forming apparatus of claim 22, wherein the vent line is fluidly coupled to the delivery line.

26. The beverage forming apparatus of claim 25, wherein the vent line branches off of the delivery line.

27. The beverage forming apparatus of claim 25, wherein the vent line is upstream of the liquid inlet of the brew chamber.

* * * * *